(12) United States Patent
Yamashita et al.

(10) Patent No.: US 7,954,113 B2
(45) Date of Patent: *May 31, 2011

(54) SIGNAL PROCESSING APPARATUS, SIGNAL PROCESSING METHOD, AND RECORDING MEDIUM

(75) Inventors: Kosei Yamashita, Kanagawa (JP); Yasushi Miyajima, Kanagawa (JP); Motoyuki Takai, Tokyo (JP); Yoichiro Sako, Tokyo (JP); Toshiro Terauchi, Tokyo (JP); Toru Sasaki, Tokyo (JP); Yuichi Sakai, Kanagawa (JP)

(73) Assignee: Sony Corporation, Tokyo (JP)

(*) Notice: Subject to any disclaimer, the term of this patent is extended or adjusted under 35 U.S.C. 154(b) by 1533 days.

This patent is subject to a terminal disclaimer.

(21) Appl. No.: 11/336,284

(22) Filed: Jan. 20, 2006

(65) Prior Publication Data

US 2006/0184597 A1    Aug. 17, 2006

(30) Foreign Application Priority Data

Jan. 20, 2005    (JP) ................ P2005-012256

(51) Int. Cl.
*G06F 3/00*    (2006.01)
*G06F 9/44*    (2006.01)
*G06F 9/46*    (2006.01)
*G06F 13/00*    (2006.01)

(52) U.S. Cl. ......... 719/320; 719/315; 717/110; 717/111
(58) Field of Classification Search .............. 719/313, 719/315, 320, 321; 717/110, 111
See application file for complete search history.

(56) References Cited

U.S. PATENT DOCUMENTS

| 4,796,179 | A  | * | 1/1989 | Lehman et al. ............ 700/86 |
| 5,544,297 | A  | * | 8/1996 | Milne et al. ............ 715/201 |
| 6,937,969 | B1 | * | 8/2005 | Vandersteen et al. ...... 703/14 |
| 2004/0045007 | A1 | * | 3/2004 | Boland et al. ........... 719/315 |
| 2005/0144587 | A1 | * | 6/2005 | Bryant .................. 717/111 |

FOREIGN PATENT DOCUMENTS

| JP | 2002-073040 A | 3/2002 |
| JP | 2004-222040 A | 8/2004 |
| WO | WO 2004/072744 A2 | 8/2004 |

* cited by examiner

*Primary Examiner* — Diem K Cao
(74) *Attorney, Agent, or Firm* — Wolf, Greenfield & Sacks, P.C.

(57) ABSTRACT

A signal processing apparatus includes the following elements. A plurality of signal processing software modules perform unit signal-processing steps of signal processing by means of software processing. An instruction input receiving unit receives an instruction. A virtual connecting unit sets up a virtual connection between inputs and outputs of the signal processing software modules in response to the received instruction. A circuit structure information storing and managing unit stores and manages the virtually connected signal processing software modules. A path routing unit routes a signal processing path to determine the order in which the stored signal processing software modules perform the signal processing. A signal processing executing unit performs the signal processing by sequentially executing the signal processing software modules in the determined order. The path routing unit determines whether a feedback loop including no delay element is generated in a circuit composed of the signal processing software modules.

14 Claims, 26 Drawing Sheets

FIG. 17

| NODE INDEX (SIGNAL PROCESSING ORDER) | NODE |
|---|---|
| 1 | NODE NO. 0 |
| 2 | NODE NO. 2 |
| 3 | NODE NO. 4 |
| 4 | NODE NO. 6 |
| 5 | NODE NO. 1 |
| 6 | NODE NO. 3 |
| 7 | NODE NO. 5 |

SIGNAL PROCESSING APPARATUS, SIGNAL PROCESSING METHOD, AND RECORDING MEDIUM

CROSS REFERENCES TO RELATED APPLICATIONS

The present invention contains subject matter related to Japanese Patent Application JP 2005-012256 filed in the Japanese Patent Office on Jan. 20, 2005, the entire contents of which are incorporated herein by reference.

BACKGROUND OF THE INVENTION

1. Field of the Invention

The present invention relates to a signal processing apparatus and method for performing signal processing including a plurality of unit signal-processing steps by means of software processing, and to a recording medium storing a program for signal processing.

2. Description of the Related Art

Recently, increasingly high-performance computers have been commercially available, and moving pictures and music have been reproducible on the computers, which was difficult in the past. Particularly, there have been available video and audio signal processing applications capable of easily performing real-time signal processing by means of software processing without using traditional dedicated signal processing devices, such as digital signal processors (DSPs), or dedicated hardware.

Such signal processing applications are supported by various types of signal processing middleware, such as DirectShow, which is a product of Microsoft® Corporation, MATLAB which is a product of The MathWorks®, Inc., and Max/MSP), which is a product of Cycling '74.

With the use of such middleware, signal processing applications can comparatively easily implement sophisticated features. For example, audio features, such as recording and reproduction, input and output, mixing, and special effects, are implemented by means of signal processing applications. Video signal processing applications having sophisticated editing features, such as non-linear editing, have also been available.

Middleware systems with a plugin configuration are disclosed in Japanese Unexamined Patent Application Publications No. 2001-109628 and No. 7-302195. A plugin is a software application that carries out a modularized feature. This document deals with signal processing. Thus, a plugin is a software application implementing a signal processing software module.

A plugin allows a user to add on and use a desired signal processing software module, as needed. While plugins are generally used individually, novel systems that allow multiple features with a combination of plugins have recently been developed. In the future, such multiple-plugin systems will become the mainstream of new added value systems.

SUMMARY OF THE INVENTION

However, existing multiple-plugin systems have some drawbacks as follows:

(a) As plugins are connected in multiple stages, the processing delay (latency) proportionally increases.

(b) The connection between plugins is limited, and it is difficult to close a feedback loop.

(c) It is difficult to change the connection between plugins during signal processing.

(d) Due to the low processing speed, it is difficult to carry out multiple features in real time.

(e) It is difficult to implement the sample accuracy for synchronization between audio and video or changing parameters.

(f) Only signal processing for a closed loop is executable on a single computer.

Several existing middleware systems partially overcome the foregoing drawbacks; however, there no middleware system that simultaneously overcomes all the drawbacks mentioned above because some of them are in conflict with each other (that is, a problem is overcome, which then adversely affects another problem). For example, it is difficult to concurrently overcome the drawbacks (b) and (d).

Such drawbacks may sometimes cause a critical bottleneck for incorporation of the systems into traditional middleware products.

The present inventors have proposed a signal processing apparatus that overcomes the foregoing drawbacks. This signal processing apparatus allows a feedback loop to be closed without limitations in the connection between plugins.

However, this signal processing apparatus still has an inevitable issue, that is, a general principle of digital signal processing, namely, a requirement of at least one or more delay elements being included in a feedback loop in a signal flow graph.

This is necessary to satisfy the causality constraint for signal processing. For example, when a user is to create a feedback loop circuit including no delay element using the above-described signal processing apparatus or the like, it is desirable that this signal processing operation immediately be canceled or ceased because the user will not obtain correct signal processing results. The circuit could output an unnecessary signal, such as noise, because of the inability of the circuit to perform correct signal processing.

Such a user operation is common, and there arises a problem that the process of producing a signal processing circuit on a signal processing apparatus is cumbersome and unfamiliar to, particularly, users who do not have the knowledge of the requirement of a delay element being included in a feedback loop.

It is therefore desirable to provide a signal processing apparatus that overcomes the foregoing drawbacks in light of this problem.

According to an embodiment of the present invention, a signal processing apparatus for performing signal processing including a plurality of unit signal-processing steps by means of software processing includes the following elements. A plurality of signal processing software modules perform the unit signal-processing steps by means of software processing. Instruction input receiving means receives an instruction to generate or delete a signal processing software module and an instruction to connect inputs and outputs of the signal processing software modules. Virtual connecting means sets up a virtual connection between the inputs and the outputs of the plurality of signal processing software modules in response to the instruction received by the instruction input receiving means. Circuit structure information storing and managing means stores and manages the set up virtual connection between the inputs and the outputs of the plurality of signal processing software modules. Path routing means routes a signal processing path to determine the signal processing order in which the plurality of the signal processing software modules stored in the circuit structure information storing and managing means perform the signal processing. Signal processing executing means performs the signal processing by sequentially executing the plurality of signal processing software modules in the signal processing order determined by the path routing means based on the signal processing path. The path routing means determines whether or not a feedback loop including no delay element is generated in a circuit composed of the plurality of signal processing software modules.

The signal processing apparatus may further include warning means for sending a warning to a user when the path routing means determines that a feedback loop including no delay element is generated in the circuit composed of the plurality of signal processing software modules.

Accordingly, when a feedback loop including no delay element is generated in a circuit composed of signal processing software modules, a warning is sent to the user. Thus, a user who does not have the knowledge of the requirement of a delay element being included in the feedback loop can take an appropriate action.

When the path routing means determines that a feedback loop including no delay element is generated in the circuit composed of the plurality of signal processing software modules, the path routing means may insert an additional delay element in the feedback loop.

Accordingly, when a feedback loop including no delay element is generated in a circuit composed of signal processing software modules, an additional delay element is automatically inserted in the feedback loop. Thus, a user who does not have the knowledge of the requirement of a delay element being included in the feedback loop can easily set up a circuit including a feedback loop.

BRIEF DESCRIPTION OF THE DRAWINGS

FIG. 17 is a diagram showing an exemplary search result of the initial path routing algorithm constituting a portion of the path routing algorithm for the signal processing apparatus according to the embodiment of the present invention;

DESCRIPTION OF THE PREFERRED EMBODIMENTS

A signal processing apparatus according to an embodiment of the present invention will be described hereinafter with reference to the drawings.

First Embodiment

A signal processing apparatus according to an embodiment of the present invention is implemented as general-purpose signal processing middleware. The middleware is hereinafter referred to as a "software signal processor (SSP)". In the following embodiments, signal processing will be discussed in the context of audio signal processing.

Figure 2:
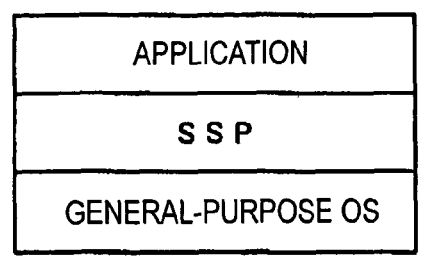
FIG. 2 is a diagram showing the signal processing apparatus according to the embodiment of the present invention.

The SSP, as shown in FIG. 2, resides between a general-purpose operating system (OS) and application software. With the use of the SSP, the application software easily implements sophisticated signal processing features. The SSP is middleware that needs no graphical user interface (GUI), and is thus useful for signal processing engines used for embedded equipment having no display device.

Overview of Signal Processing Apparatus of Embodiment

The SSP, which is an implementation of a signal processing apparatus according to an embodiment of the present invention, is middleware with a graph structure, and is basically implemented on a single computer. However, as discussed below, the SSP may be implemented on a plurality of computers connected via a network.

A signal processing apparatus according to an embodiment of the present invention, which is implemented as SSP, is composed of two parts; a graph module implemented by software (hereinafter referred to simply as a "graph") and a plugin module implemented by software (hereinafter referred to simply as a "plugin").

The plugin module is a signal processing software module for executing a unit signal-processing step, such as filter, equalizer, or gain control.

In this example, the plugin may have a plurality of input ports and a plurality of output ports. The plugin performs signal processing unique to the plugin on audio signals input from the input ports, and outputs the resulting signals from the output ports.

An output port of a plugin is connected to an input port of another plugin (this connection is a virtual connection, which means that an output signal from a plugin is input to another plugin, rather than a hardware connection. This virtual connection is hereinafter referred to as a "connection"). A plurality of plugins can be connected to implement multiple signal processing features. The plugins are connected only by connecting an input port of a plugin to an output port of another plugin. The connection of input ports of plugins or output ports of plugins is not permitted.

The graph plays a roll of an SSP system, and is adapted to include a plurality of plugins. The graph holds various signal-processing functions. In response to an operation input from a user, the graph generates or deletes a plugin, or connects ports of plugins, and holds resulting circuit structure information. The signal-processing functions stored in the graph include a plugin generating and deleting function. Inside the graph, therefore, an arbitrary circuit composed of a plurality of plugins can be set up.

The graph, when a signal-processing function of this graph is called, sequentially transfers received audio data with time information to the plugins included in the graph. The graph also plays a role of inputting and outputting audio data and attached information to the plugins.

Further, the graph includes the properties of a plugin. Thus, like plugins, the graph has input and output ports so that the graph can be interconnected with another plugin. With the ability of a graph to include a plurality of plugins, by creating a graph, a circuit block (graph) composed of a plurality of plugins can be handled as a single plugin. The graph handled as a single plugin has a function for handling a collection of circuits as a single component.

Exemplary Graph

Figure 3:
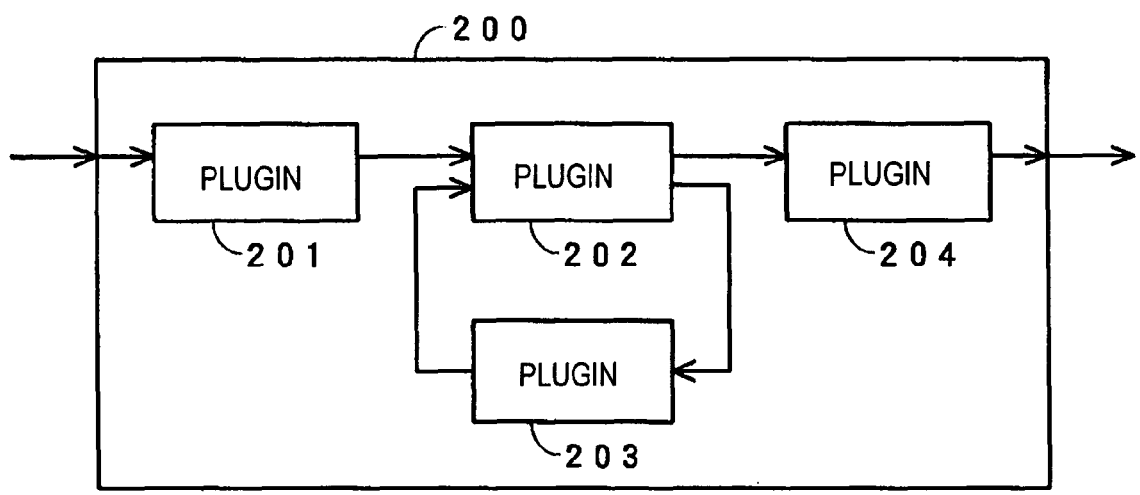
FIG. 3 is a diagram showing the signal processing apparatus according to the embodiment of the present invention.

FIG. 3 shows an exemplary graph including a plurality of internal plugins. A signal processing apparatus according to an embodiment of the present invention can be implemented by a personal computer (PC) so that an input from or an output to a user can be received and graphs, plugins, and connections thereof can graphically be displayed on a display unit of the PC according to a user instruction.

In the example shown in FIG. 3, a user first creates a basic root graph 200, and then creates a circuit composed of a plurality of plugins 201 to 204 in the graph 200. The plugins 201 to 204 may be selected from plugins pre-stored in the PC. The pre-stored plugins are stored in the form of templates, called object-oriented classes, before objects are actually generated.

For example, the user selects the plugins 201 to 204 from plugins stored in a storage unit of the PC, and dynamically generates (or maps) the selected plugins 201 to 204 in the graph 200. Object-oriented objects are thus generated. The user instructs that output ports and input ports of the plugins 201 to 204 be connected and that the graph 200 and the plugins 201 and 204 be connected, thereby setting up a circuit shown in FIG. 3.

The graph 200 holds circuit structure information of the internal plugins 201 to 204. Once the user calls a signal-processing function of the root graph 200, signal-processing functions of the internal plugins 201 to 204 are sequentially called recursively from within the signal-processing function of the root graph 200, and calculations associated with the signal processing are successively performed. The propagation of the recursive signal-processing function calls is an implementation of the SSP system itself.

Figure 4:
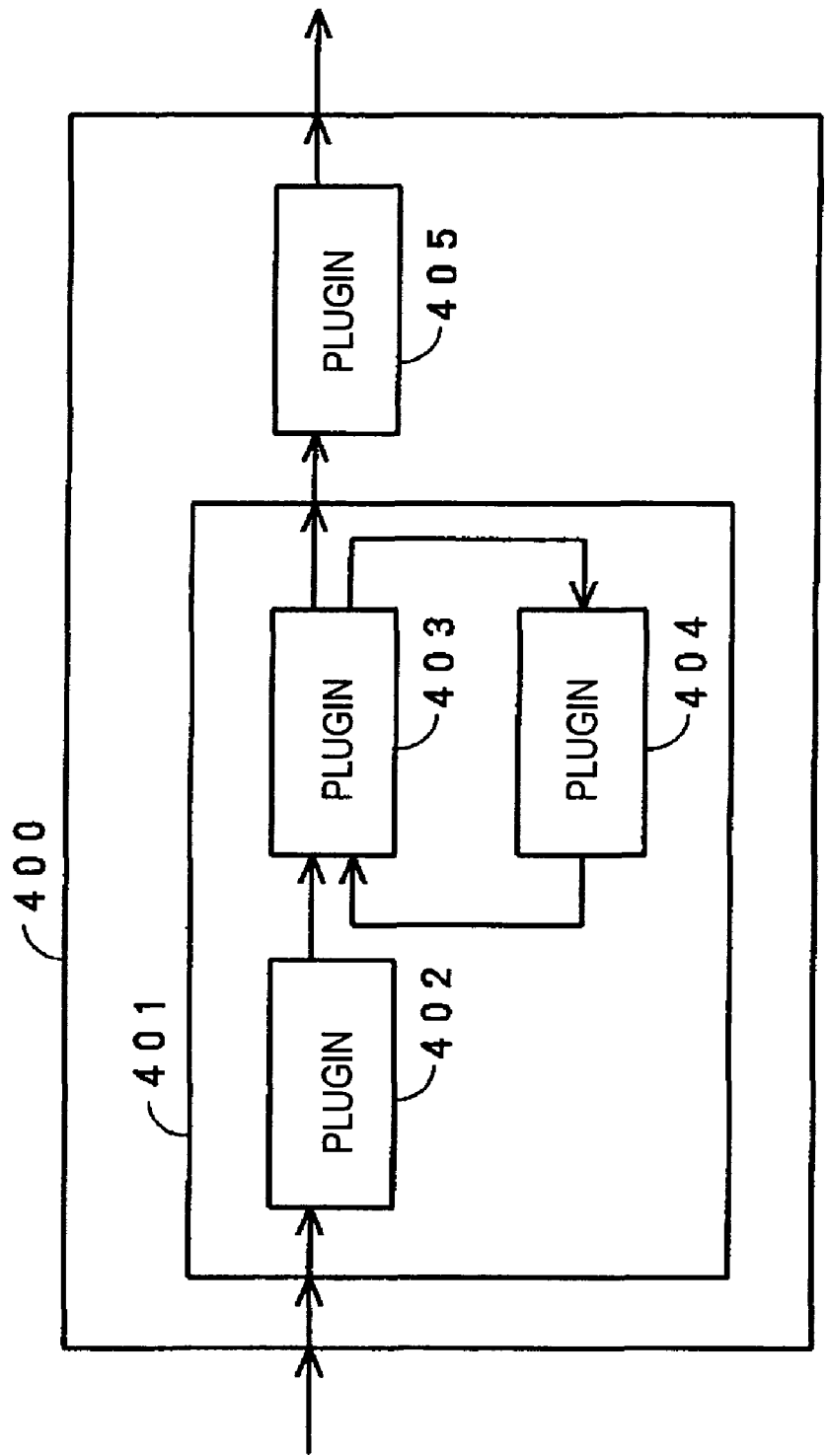
FIG. 4 is a diagram showing the signal processing apparatus according to the embodiment of the present invention.

FIG. 4 shows another exemplary graph including a plurality of internal plugins. As discussed above, a graph is also a plugin. Thus, a graph may recursively be constructed such that the graph includes the graph itself (a child-graph) and a plugin other than the graph. Like other plugins, the graph has input and output ports. The inside of the graph defines a black box, which is hidden from outside the graph. Inside the graph, a circuit block composed of a plurality of plugins is defined.

In FIG. 4, a parent-graph 400 holds a graph 401, which is a child-graph, and a plugin 405. The child-graph 401 holds plugins 402, 403, and 404. The plugins 402, 403, and 404 insides the child-graph 401 are hidden from the parent-graph 400, and the child-graph 401 is viewed as a single plugin.

First, the user creates a root graph (i.e., the parent-graph 400), which is a root. Once the user calls a plugin generating and deleting function of the root graph 400, the child-graph 401 and the plugin 405 is generated inside the root graph.

When the user calls a plugin generating and deleting function of the child-graph 401, the plugins 402, 403, and 404 are generated in a similar manner.

In order to perform signal processing, first, the user calls a signal-processing function of the root graph 400. Then, signal-processing functions of the child-graph 401 handled as a plugin and the plugin 405 inside the root graph 400 are sequentially called recursively from within the signal-processing function of the root graph 400, and calculations are successively performed. The order of the recursive signal-processing function calls is also determined by the graph.

In the child-graph 401, the signal-processing function of the child-graph 401 is first called. Then, the signal-processing functions of the plugins 402, 403, and 404 inside the child-graph 401 are sequentially called recursively from within the signal-processing function of the child-graph 401, and calculations are successively performed.

An implementation of the SSP system is the above-described graph operation itself. The graph, or the plugin itself, deals with the functions needed for the system, such as the generation and deletion of a plugin, the connection between plugins, the transfer of data between the plugins, the application of synchronization between time information and audio and video information to a plugin, sequential calls of signal-processing functions of the plugins, and the determination of the order of the function calls.

In the following description, the term system means a graph itself or functions of the graph.

Figure 5:
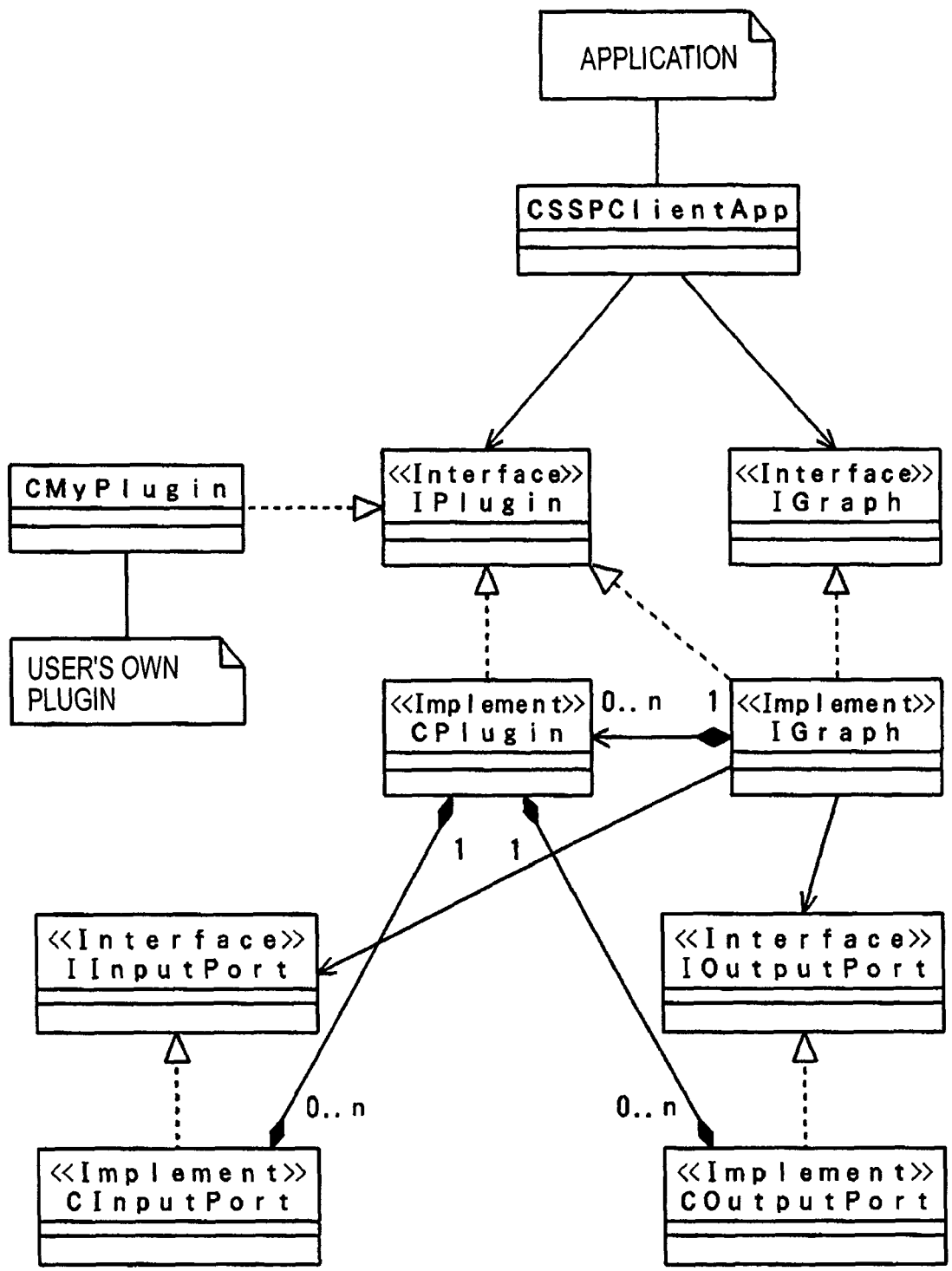
FIG. 5 is a diagram showing the signal processing apparatus according to the embodiment of the present invention.

FIG. 5 is a unified modeling language (UML) class diagram showing the overall structure of SSP middleware as an exemplary implementation. This diagram is represented in an object-oriented model, in which classes and interfaces (application programming interfaces (APIs)) are defined.

A plugin class (CPlugin) inherits a plugin interface (IPlugin), and implements a plugin-unique interface. The plugin class holds a plurality of input port classes (CInputPort) and output port classes (COutputPort).

There are multiple types of plugin classes depending on their functions. For example, an adder plugin class is a plugin class for performing addition, and a multiplier plugin is a plugin class for performing multiplication. These classes are classified as user's own plugin (CMyPlugin) class. The user's own plugin class inherits the plugin class. In this example, the middleware user uses a plugin template to easily create his/her own plugin.

Next, a graph class will be described. A graph class (CGraph) includes a plurality of plugin classes. Like the plugin class, the graph class also inherits the plugin interface (IPlugin), and is also a plugin class.

The graph class thus has a recursive hierarchical structure in which a graph includes another graph and a plugin. This structure corresponds to a structure, called a composite pattern in general object-oriented design patterns.

Further, the graph also includes the properties of a plugin. Thus, like other plugins, the graph has input and output ports so that the graph can be interconnected with another plugin. Once a graph object is created, a circuit block composed of a plurality of plugin objects is handled as a single component object.

The interfaces (APIs) of the graph class and the plugin class are defined. By calling the APIs from an SSP middleware client application, the objects are controllable. The operation performed by the user for the SSP system is performed on these two types of objects.

Plugin Structure

Figure 6:
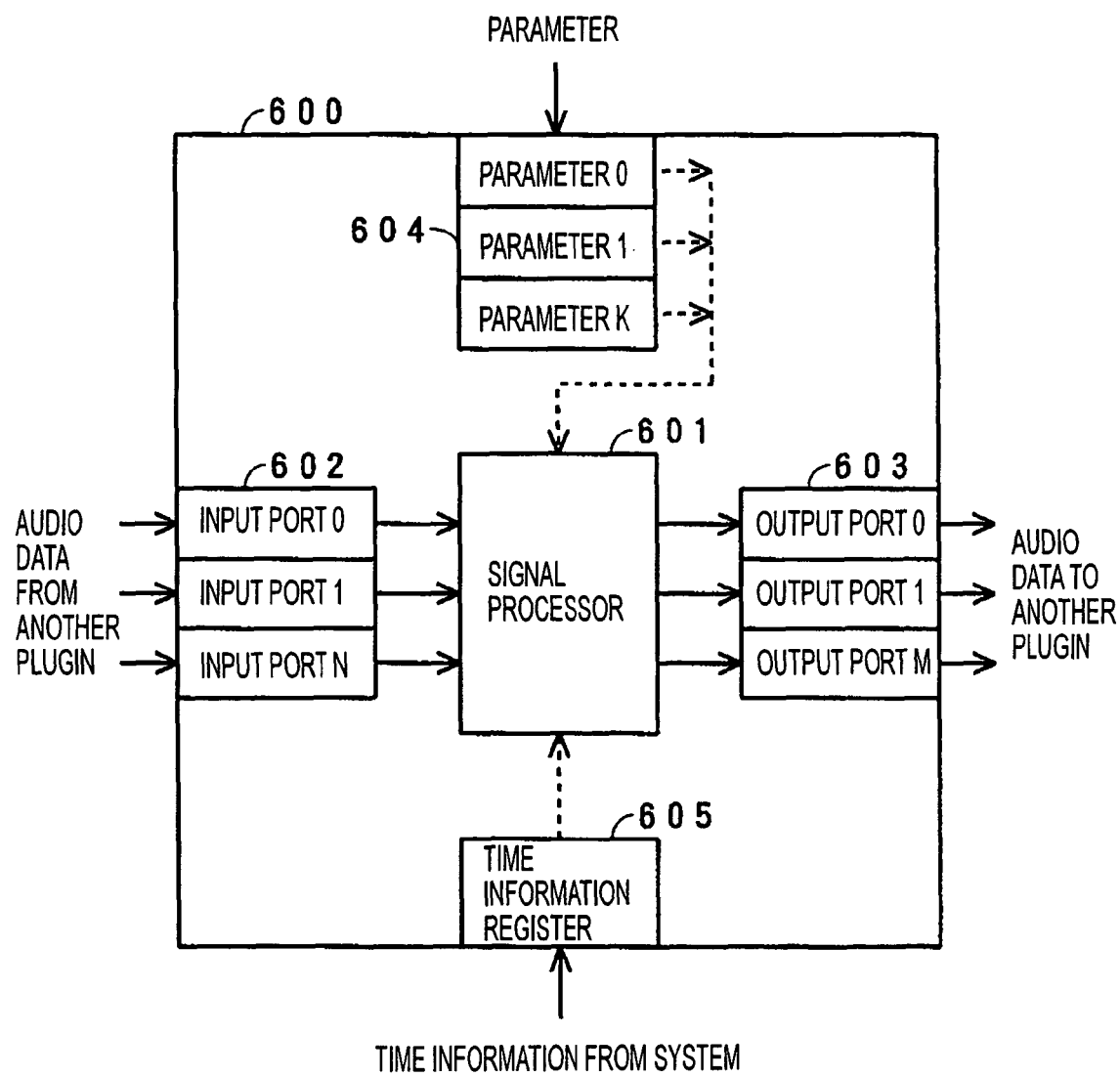
FIG. 6 is a diagram showing a plugin structure in the signal processing apparatus according to the embodiment of the present invention.

FIG. 6 shows an example structure of a plugin 600. As discussed above, the plugin 600 is a signal processing software module, and the components shown in FIG. 6 are provided as software functions rather than hardware.

As shown in FIG. 6, the plugin 600 can include a signal processor 601, zero or more input ports 602, and zero or more output ports 603. That is, the plugin 600 may include no input ports 602 or no output ports 603, or may include one or a plurality of input ports 602 and one or a plurality of output ports 603.

The plugin 600 can exchange signals, e.g., audio data, with another plugin or other plugins via the input port or ports 602 and the output port or ports 603. In this example, audio signals of one channel per port are input and output.

The user instructs the plugin 600 to add or delete the input port 602 and the output port 603, thus dynamically changing the number of input ports 602 and output ports 603 of the plugin 600 even during signal processing. The input ports 602 and the output ports 603 are assigned identification numbers 0 to N, where N is any natural number, and 0 to M, where M is any natural number, respectively, according to the order in which the ports are added. The user selects identification numbers to specify one of the input ports 602 and one of the output ports 603.

The plugin 600 further includes zero or more parameter holding sections (parameter buffers) 604 for storing zero or more parameters. The parameters are variable values for setting the amount of effects in signal processing and so forth, and are entered by the user. For example, when the plugin 600 is implemented as an amplifier, the parameters include an amplification gain value. The user of the plugin 600 changes the parameter values of the plugin 600 to change the effects of signal processing.

In this example, the parameters are assigned identification numbers 0 to K, where K is any natural number. The user specifies the identification number of any parameter to change the content of the buffered parameter at an arbitrary timing. In the mechanism of the plugin 600, a parameter given by the user is stored in the parameter buffer 604 inside the plugin 600. A parameter is read according to the time information synchronized with sample data provided from the system (i.e., the graph), and is then transmitted to the signal processor 601 for its signal processing.

The plugin 600 further includes a time information register 605 that constantly receives time information from the SSP system (i.e., the graph). The time information represents the number of accumulated counts of audio input or output data samples, starting at the start time of the SSP system (that is, the start time of the signal-processing function of the graph). The number of accumulated counts is the most basic time information in the SSP system.

In the SSP system of this embodiment, the time information and the audio input or output data are completely synchronized with each other. The SSP system supplies the time information to the plugin 600 together with the audio data. The time information therefore serves as a time stamp of the data samples of the audio data input to the plugin 600 for allowing the plugin 600 itself to know detailed time information, such as what sample in the absolute time domain the input data to be subjected to signal processing corresponds to. All plugins present inside the SSP system are synchronized with one another while referring to the absolute time, and the entire circuit in the SSP system can realize synchronous signal processing with the sample accuracy.

The plugin 600 includes the signal processor 601. Audio data input from another plugin is transmitted to the signal processor 601 via the input port 602. The signal processor 601 performs signal processing unique to the plugin 600 on the audio data obtained from the input port 602 while referring to the time information or the parameter value sent to the signal processor 601. The audio data processed by the signal processor 601 is transmitted to another plugin via the output port 603.

In synchronization with the time information, the processing in the plugin 600 can be performed not only on a sample-by-sample basis but also on a unit-by-unit basis, wherein each unit consists of a plurality of samples, e.g., on a packet-by-packet basis. In plugins, signal-processing functions are called on a unit-by-unit basis. Thus, in a case of performing signal processing on a packet-by-packet basis, signal-processing functions are called one time per packet, and the number of function calls is reduced while increasing the signal processing speed.

Example Graph Structure

Figure 7:
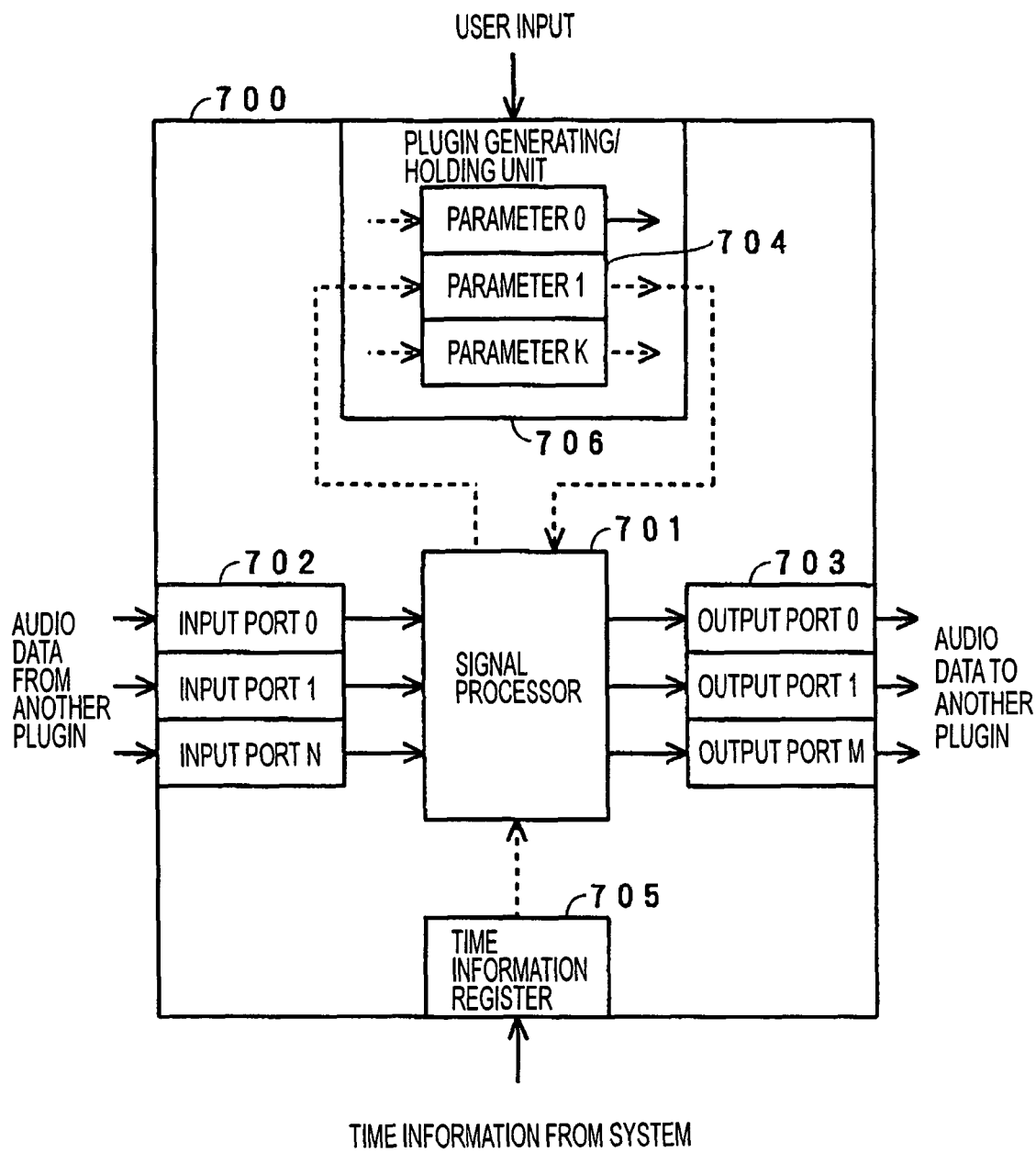
FIG. 7 is a diagram showing a graph structure in the signal processing apparatus according to the embodiment of the present invention.

FIG. 7 is a diagram showing an example structure of a graph 700. As discussed above, the graph 700 is a signal processing software module, and the components of the graph 700 shown in FIG. 7 are provided as software functions rather than hardware.

As discussed above, the graph 700 also includes the properties of a plugin, and includes a signal processor 701, an input port 702, an output port 703, a parameter buffer 704, and a time information register 705. The signal processor 701 reads a plugin included in the graph 700. The functions of the input port 702, the output port 703, the parameter buffer 704, and the time information register 705 are similar to those of the corresponding components in the plugin 600 described above with reference to FIG. 6, and a description thereof is thus omitted. It is to be understood that the parameters stored in the parameter buffer 704 are parameters with respect to the graph 700.

Functions specific to the graph 700 will now be described.

The graph 700 includes an internal plugin generating and holding unit 706. The graph 700 can include zero or more plugins. The user instructs the graph 700 to add or delete a plugin, thus dynamically generating or deleting a plugin even during signal processing. The dynamic generation or deletion of a plugin during signal processing is described in detail below.

In the graph 700, the generated plugins are assigned identification numbers 0 to J, where J is any natural number, according to the order in which the plugins are added. The user identifies the plugins using the identification numbers. The plugins are not necessarily stored in the order of the identification numbers in the plugin generating and holding unit 706 of the graph 700. In graph 700, the plugins are sorted in the order of the successive calculations, described below, and are stored in the plugin generating and holding unit 706.

The user can also instruct the graph 700 to connect the plugins included in the graph 700. The connection between an output port of a given plugin and an input port of another given plugin can dynamically be changed even during signal processing. The dynamic change can be performed by the user specifying to the graph 700 the identification numbers of the plugins and the identification numbers of the ports. In response to an instruction from the user to change the connection, the graph 700 changes the connection state of the plugins.

The user instructs the graph 700 to initiate signal processing. When the user calls a signal-processing function of the graph 700, signal-processing functions of the plugins included in the graph 700 are sequentially called recursively from within the signal-processing function of the graph 700. When the signal-processing function is called, the signal processors of the graph and plugins included in the graph 700 are sequentially executed according to the order of successive calculations. The graph and plugins are sorted in the order of the successive calculations, and are stored in the plugin generating and holding unit 706.

Calculations are successively performed in the graph and plugins included in the graph 700, whereby the overall circuit set up in the graph 700 achieves multiple signal processing operations. The order of the successive calculations is determined by the system (i.e., the graph 700) depending on the connection between the plugins.

In a case of modifying the circuit design according to a user instruction, such as adding or deleting a plugin or changing the connection between an input port and an output port, the graph 700 performs path routing, discussed below, to automatically determine the optimum order of successive calculations for the plugins and child-graph included in the graph 700. The optimum order of successive calculations for the plugins included in the child-graph is automatically determined by the child-graph performing path routing.

As a result of the path routing performed by the graph 700, the plugin group (including the child-graph as a plugin) is stored in the plugin generating and holding unit 706 in the manner that the plugins are sorted in the optimum order of successive calculations. A path routing algorithm of the graph 700 is described in detail below.

Functional Block Diagram of Graph

Figure 1:
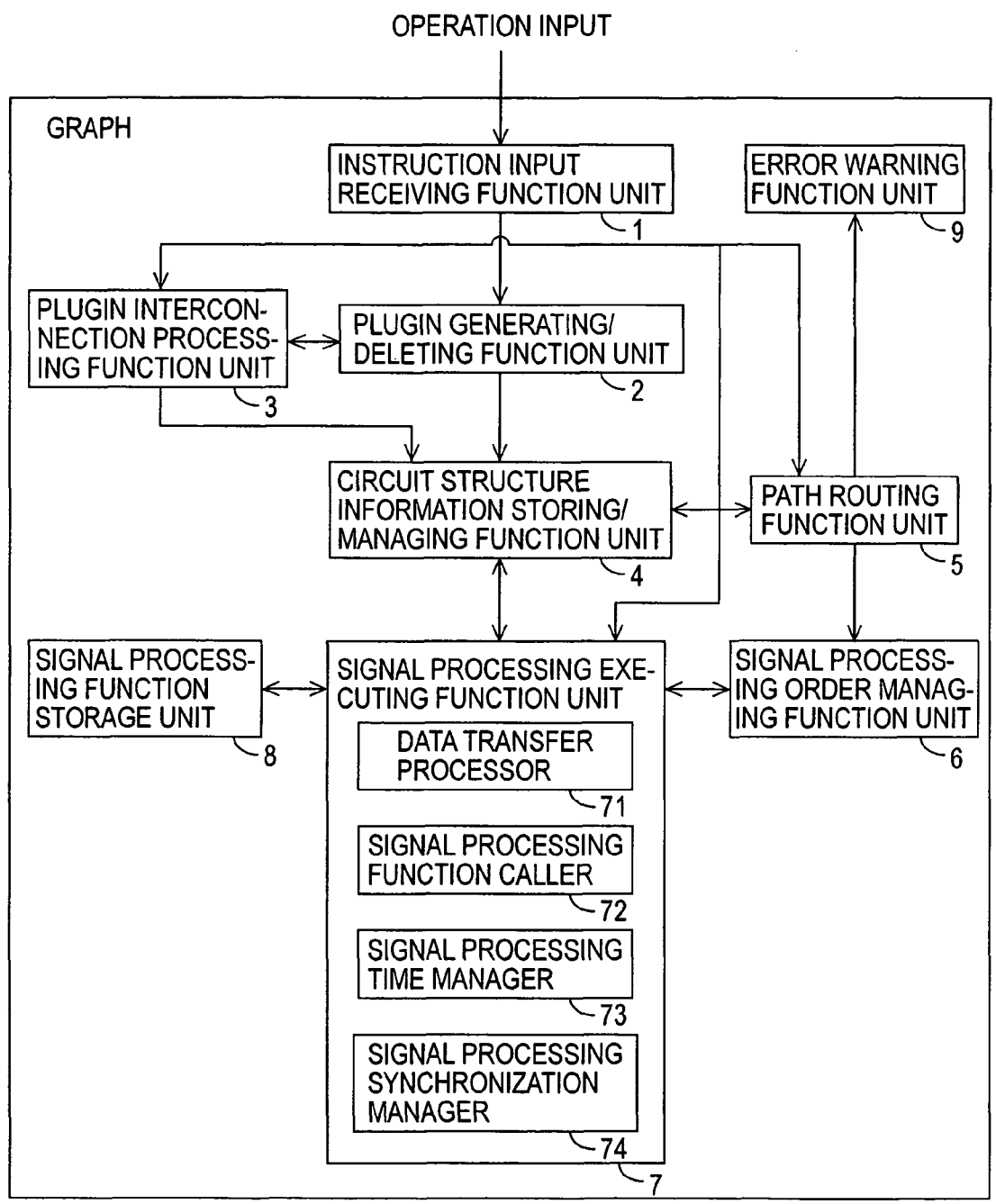
FIG. 1 is a functional block diagram of the main part of a signal processing apparatus according to a first embodiment of the present invention.

FIG. 1 is a functional block diagram of a signal processing apparatus according to a first embodiment of the present invention, showing a graph structure in which functions of a graph are represented by blocks. The graph includes an instruction input receiving function unit 1, a plugin generating and deleting function unit 2, a plugin interconnection processing function unit 3, a circuit structure information storing and managing function unit 4, a path routing function unit 5, a signal processing order managing function unit 6, a signal processing executing function unit 7, a signal processing function storage unit 8, and an error warning function unit 9.

The instruction input receiving function unit 1 receives a user instruction to generate or delete a plugin, to connect an input port of a plugin and an output port of another plugin, to input a parameter, and so on. The instruction input receiving function unit 1 transfers the plugin generation or deletion instruction to the plugin generating and deleting function unit 2, and the input and output port connection instruction to the plugin interconnection processing function unit 3. In response to the plugin generation or deletion instruction or the input and output port connection instruction, the instruction input receiving function unit 1 activates the path routing function unit 5 to perform path routing. The instruction input receiving function unit 1 is also adapted to hold an input parameter in a parameter buffer in response to the parameter input instruction.

The plugin generating and deleting function unit 2 generates or deletes a plugin in response to the plugin generation or deletion instruction from the instruction input receiving function unit 1. When a plugin is generated, the generated plugin is assigned an identification number, and information of the generated plugin including the identification number is transferred to the circuit structure information storing and managing function unit 4. When a plugin is deleted, deletion information including the identification number of the deleted plugin and the deletion request is transferred to the circuit structure information storing and managing function unit 4.

In response to the plugin interconnection instruction from the instruction input receiving function unit 1, the plugin interconnection processing function unit 3 transfers the connection information between the output port and the input port of the plugins specified by the connection instruction to the circuit structure information storing and managing function unit 4.

The circuit structure information storing and managing function unit 4 stores and manages information relating to the circuit set up in the graph from the plugin generation information, deletion information, or connection information from the plugin generating and deleting function unit 2 or the plugin interconnection processing function unit 3.

The path routing function unit 5 activates and executes a path routing algorithm, described below, in response to the plugin generation or deletion instruction or an activation instruction based on the input and output port connecting instruction from the instruction input receiving function unit 1. As a result of the path routing algorithm, the path routing function unit 5 determines the order in which the plugins sequentially perform calculations (hereinafter referred to as "signal processing order"), and sends information relating to the signal processing order to the signal processing order managing function unit 6. The signal processing order managing function unit 6 arranges the identification information on the plugins in the signal processing order, and holds the plugins in the plugin generating and holding unit 706 shown in FIG. 7.

As shown in FIG. 1, the signal processing executing function unit 7 includes a data transfer processor 71, a signal-processing function caller 72, a signal processing time manager 73, and a signal processing synchronization manager 74.

The signal processing executing function unit 7 initiates signal processing using the circuit set up in the graph in response to a signal processing initiation instruction input via the instruction input receiving function unit 1. When the user instructs that a signal-processing function of the graph be called, the signal-processing function caller 72 reads the instructed signal-processing function of the graph from the signal processing function storage unit 8. While the signal-processing function caller 72 reads the signal-processing function of the graph in response to a user instruction, signal-processing functions of the plugins in the graph are sequentially called recursively from within the signal-processing function of the graph.

The data transfer processor 71 of the signal processing executing function unit 7 refers to the circuit information stored in the circuit structure information storing and managing function unit 4, and sequentially transfers audio data to the plugins according to the circuit structure.

The signal processing time manager 73 manages time in units of data samples transferred from the data transfer processor 71. The signal processing synchronization manager 74 manages packet synchronization (e.g., a packet header) during signal processing on a packet-by-packet basis or AV synchronization for allowing the processing timing of audio data to be synchronized with frames of video data.

Even during signal processing by the signal processing executing function unit 7, the path routing function unit 5 performs path routing on the circuit structure that is changed in response to a request to change the circuit structure in the graph from the instruction input receiving function unit 1, and transmits the routed path to the circuit structure information storing and managing function unit 4 and the signal processing order managing function 6. The signal processing executing function unit 7 then performs signal processing on the changed circuit structure according to the signal processing order determined based on the routed path obtained from the changed circuit structure.

As discussed above, it is necessary to create a signal processing circuit in the graph so as to satisfy the general principle of digital signal processing, namely, the requirement of at least one or more delay elements being included in a feedback loop in a signal processing flow graph.

However, a user who does not have the knowledge of the requirement of a delay element being included in a feedback loop can create a circuit not satisfying this requirement in the graph. When such a circuit including no delay element in a feedback loop is set up in the graph, in an initial path routing algorithm, discussed below, the path routing function unit 5 detects the circuit as an error. The path routing function unit 5, when detecting such an error, notifies the error warning function unit 9 of the detected error.

When it is determined that a circuit including no delay element in a feedback loop is set up in the graph in response to the notification of the detected error from the path routing function unit 5, the error warning function unit 9 warns the user with an audio and/or visual error message, such as "closed loop without delay cannot be created".

In response to the warning, the user checks the feedback loop of the circuit created by the user and modifies the circuit so that an additional delay element is inserted at an appropriate position.

Process for Creating a Circuit with Graph Structure

Figure 8:
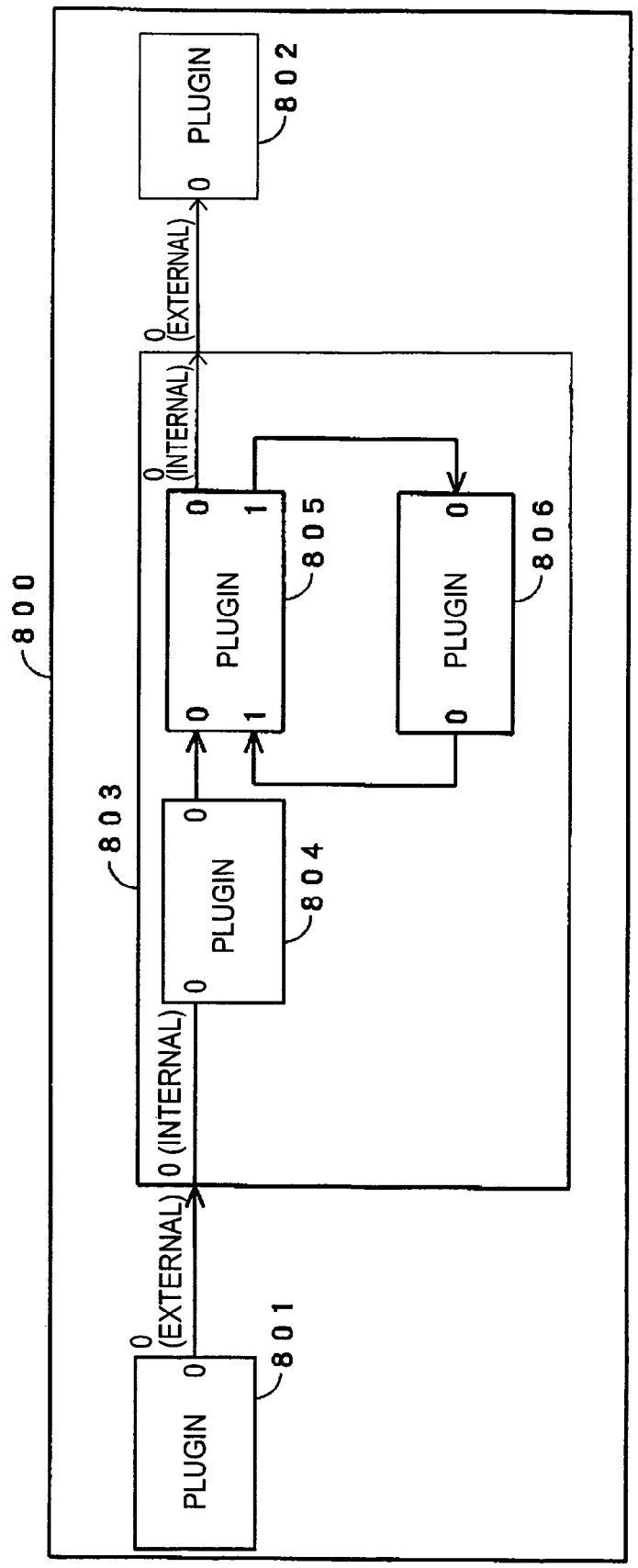
FIG. 8 is a diagram showing an example circuit structure of the signal processing apparatus according to the embodiment of the present invention.
Figure 9:
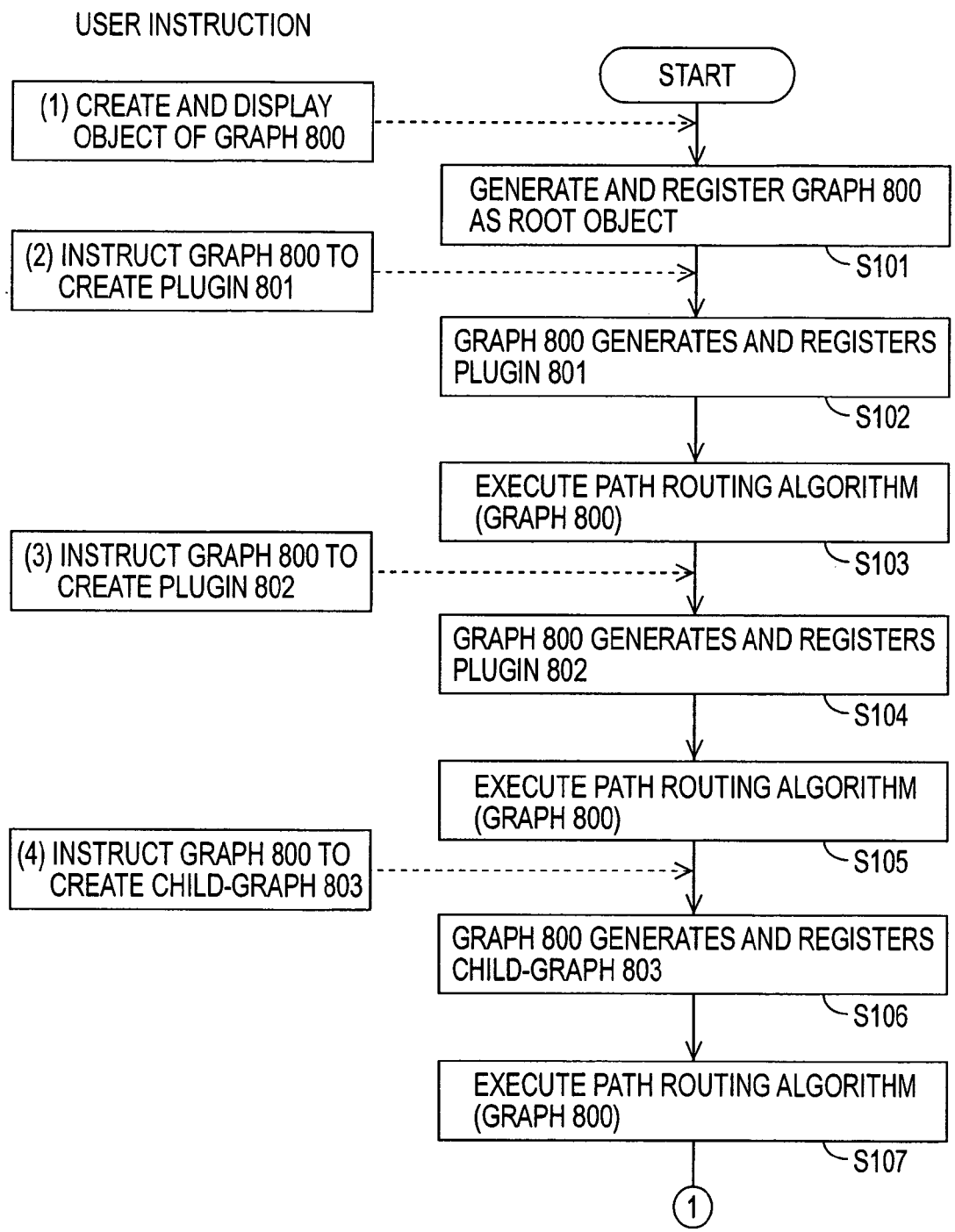
FIG. 9 is a flowchart showing an exemplary circuit set-up procedure for the signal processing apparatus according to the embodiment of the present invention.
Figure 10:
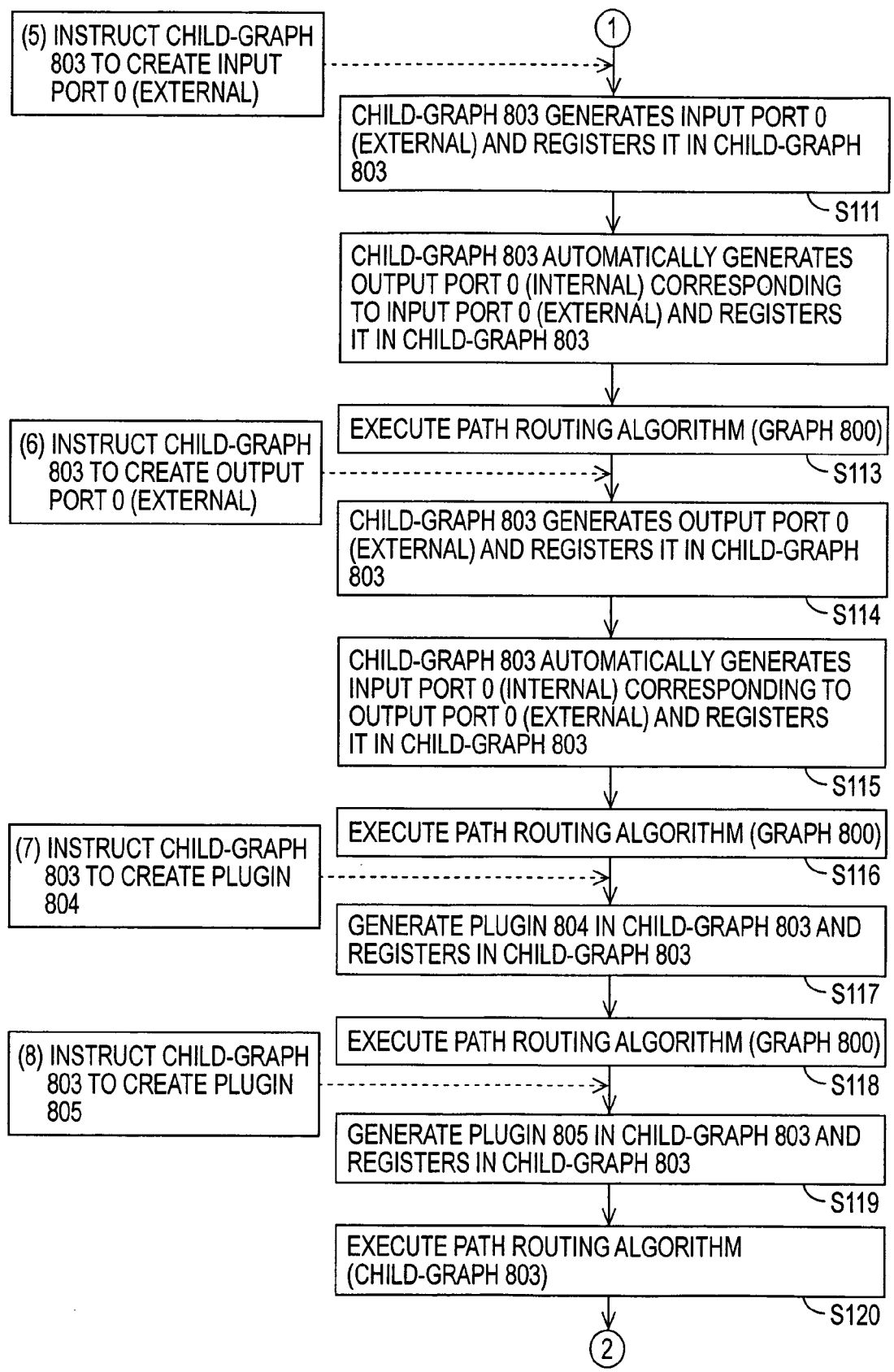
FIG. 10 is a flowchart showing the exemplary circuit set-up procedure for the signal processing apparatus according to the embodiment of the present invention.
Figure 11:
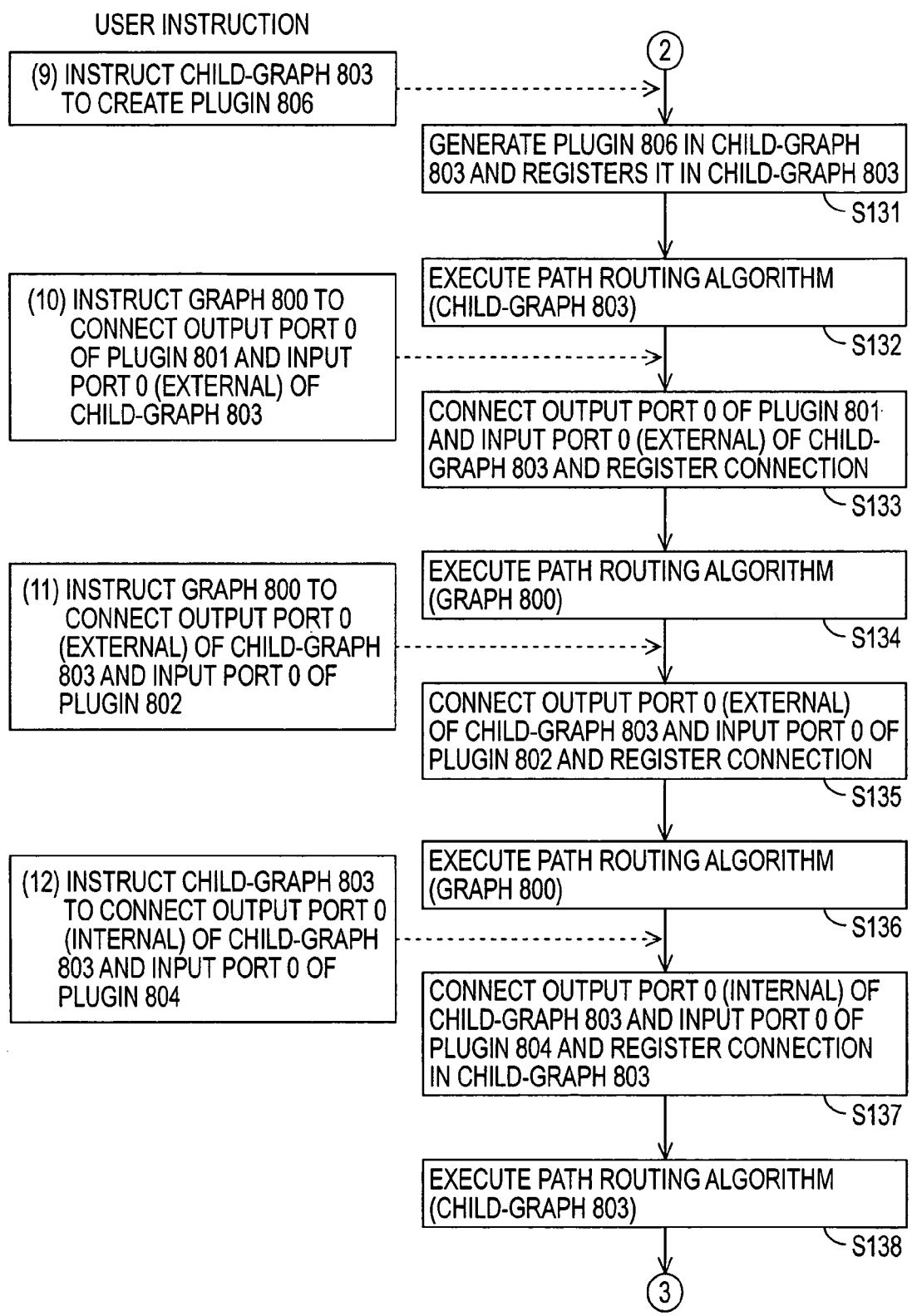
FIG. 11 is a flowchart showing the exemplary circuit set-up procedure for the signal processing apparatus according to the embodiment of the present invention.
Figure 12:
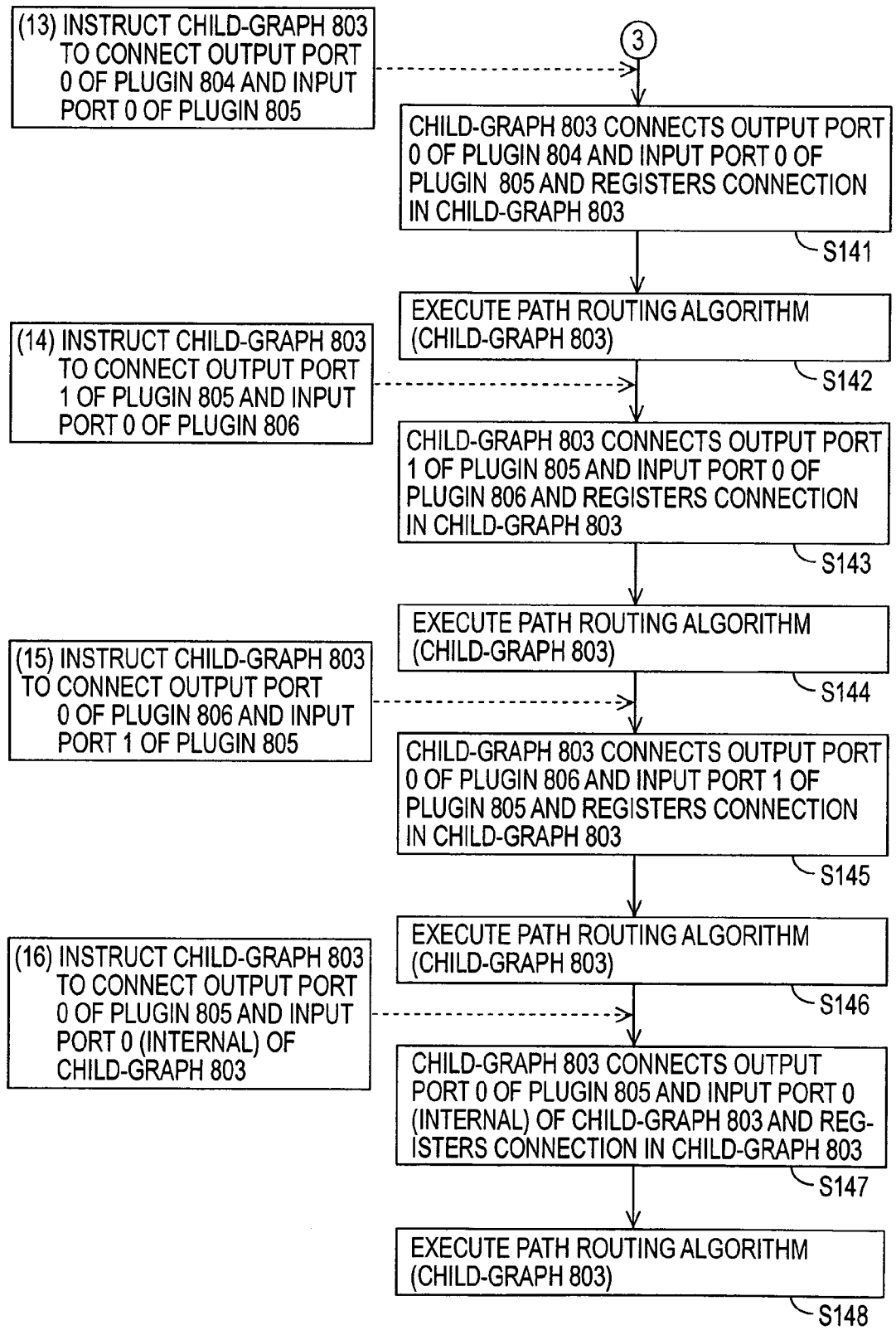
FIG. 12 is a flowchart showing the exemplary circuit set-up procedure for the signal processing apparatus according to the embodiment of the present invention.

A process for creating a signal processing circuit according to the first embodiment will now be described in the context of a case where a circuit with a structure shown in FIG. 8 is created in the graph. In the following description, graphs and plugins are referred to as "objects". In object-oriented terminology, an object is an instance, which is an entity of a graph or a plugin.

In generating objects, the number of input and output ports of each of the graphs and plugins is set as default (initial values) as below. The user may add or delete an input port and/or an output port after generating the objects.

For the parent-graph 800, the number of input ports is 0, and the number of output ports is 0.

For the plugin 801, the number of input ports is 0, and the number of output ports is 1.

For the plugin 802, the number of input ports is 1, and the number of output ports is 0.

For the child-graph 803, the number of input ports is 1, and the number of output ports is 1.

For the plugin 804, the number of input ports is 1, and the number of output ports is 1.

For the plugin 805, the number of input ports is 2, and the number of output ports is 2.

For the plugin 806, the number of input ports is 1, and the number of output ports is 1.

In the following description, the numbers following the input ports and the output ports represent port numbers, using 0, 1, and 2.

Circuit Creation Procedure

A procedure for creating the circuit shown in FIG. 8 will now be described with reference to a flowchart shown in FIGS. 9 to 12. In FIGS. 9 to 12, for ease of understanding, user instructions are illustrated in association with the operation of the signal processing apparatus according to the embodiment. Although not shown, the signal processing apparatus according to the embodiment displays a view in accordance with an instruction input by the user on a display screen, thus allowing the user to perform an input operation while viewing the display screen.

First, the user instructs the signal processing apparatus to create an object of the graph 800 (parent-graph) (user instruction (1)). Then, the signal processing apparatus generates the parent-graph 800 as a root object, and registers it (step S101).

The user instructs the object of the graph 800 to create an object of the plugin 801 (user instruction (2)). Then, in the signal processing apparatus, the plugin generating and deleting function of the created graph 800 is exercised to generate the plugin 801 inside the graph 800 and to register it (step S102). In response to the plugin generation instruction, the path routing function unit 5 in the graph 800 performs path routing (step S103).

The user instructs the object of the graph 800 to create an object of the plugin 802 (user instruction (3)). Then, in the signal processing apparatus, the plugin generating and deleting function of the graph 800 is exercised to generate the plugin 802 inside the graph 800 and to register it (step S104). In response to the plugin generation instruction, the path routing function unit 5 in the graph 800 performs path routing (step S105).

The user instructs the object of the graph 800 to create an object of the graph 803 (child-graph) (user instruction (4)). Then, the graph 800 exercises the plugin generating and deleting function to generate the child-graph 803 inside the graph 800 as a plugin and to register it (step S106). In response to the plugin generation instruction, the path routing function unit 5 in the graph 800 executes path routing (step S107).

The user instructs the object of the graph 803 to create input port 0 (external) (user instruction (5)). Then, in the signal processing apparatus, as a function of the generated child-graph 803, the input port 0 (external) is generated and registered in the child-graph 803 (step S111). In the child-graph 803, internal output port 0 (internal) corresponding to the input port 0 (external) is automatically generated (step S112). In response to the port creation instruction, the path routing function unit 5 in the child-graph 803 performs path routing (step S113).

The user instructs the object of the child-graph 803 to create output port 0 (external) (user instruction (6)). Then, in the signal processing apparatus, as a function of the generated child-graph 803, output port 0 (external) is generated and registered in the child-graph 803 (step S114). In the child-graph 803, internal input port 0 (internal) corresponding to the output port 0 (external) is automatically generated (step S115). In response to the port creation instruction, the path routing function unit 5 in the child-graph 803 performs path routing (step S116).

The user instructs the object of the child-graph 803 to create an object of the plugin 804 (user instruction (7)). Then, the plugin generating and deleting function of the child-graph 803 is exercised to generate the plugin 804 inside the child-graph 803 and to register it (step S117). In response to the plugin generation instruction, the path routing function unit 5 in the child-graph 803 performs path routing (step S118).

The user instructs the object of the child-graph 803 to create an object of the plugin 805 (user instruction (8)). Then, the plugin generating and deleting function of the child-graph 803 is exercised to generate the plugin 805 inside the child-graph 803 and to register it (step S119). In response to the plugin generation instruction, the path routing function unit 5 in the child-graph 803 performs path routing (step S120).

The user instructs the object of the child-graph 803 to create an object of the plugin 806 (user instruction (9)). Then, the plugin generating and deleting function of the child-graph 803 is exercised to generate the plugin 806 inside the child-graph 803 and to register it (step S131). In response to the plugin generation instruction, the path routing function unit 5 in the child-graph 803 performs path routing (step S132).

The user instructs the object of the graph 800 to connect output port 0 of the plugin 801 and the input port 0 (external) of the child-graph 803 (user instruction (10)). Then, the graph 800 exercises the plugin interconnection processing function unit 3 to connect the output port 0 of the plugin 801 and the input port 0 (external) of the child-graph 803 and to register the connection in the graph 800 (step S133). In response to the port connection instruction, the path routing function unit 5 in the graph 800 performs path routing (step S134).

The user instructs the object of the graph 800 to connect the output port 0 (external) of the child-graph 803 and input port 0 of the plugin 802 (user instruction (11)). Then, the graph 800 exercises the plugin interconnection processing function unit 3 to connect the output port 0 (external) of the child-graph 803 and the input port 0 of the plugin 802 and to register the connection in the graph 800 (step S135). In response to the port connection instruction, the path routing function unit 5 in the graph 800 performs path routing (step S136).

The user instructs the object of the child-graph 803 to connect the internal output port 0 (internal) of the child-graph 803 and input port 0 of the plugin 804 (user instruction (12)). Then, the child-graph 803 exercises the plugin interconnection processing function unit 3 to connect the internal output port 0 (internal) of the child-graph 803 and the input port 0 of the plugin 804 and to register the connection in the child-graph 803 (step S137). In response to the port connection instruction, the path routing function unit 5 in the child-graph 803 performs path routing (step S138).

The user instructs the object of the child-graph 803 to connect output port 0 of the plugin 804 and input port 0 of the plugin 805 (user instruction (13)). Then, the child-graph 803 exercises the plugin interconnection processing function unit 3 to connect the output port 0 of the plugin 804 and the input port 0 of the plugin 805 and to register the connection in the child-graph 803 (step S141). In response to the port connection instruction, the path routing function unit 3 in the child-graph 803 performs path routing (step S142).

The user instructs the object of the child-graph 803 to connect output port 1 of the plugin 805 and input port 0 of the plugin 806 (user instruction (14)). Then, the child-graph 803 exercises the plugin interconnection processing function unit 3 to connect the output port 1 of the plugin 805 and the input port 0 of the plugin 806 and to register the connection in the child-graph 803 (step S143). In response to the port connection instruction, the path routing function unit 5 in the child-graph 803 performs path routing (step S144).

The user instructs the object of the child-graph 803 to connect output port 0 of the plugin 806 and input port 1 of the plugin 805 (user instruction (15)). Then, the child-graph 803 exercises the plugin interconnection processing function unit 3 to connect the output port 0 of the plugin 806 and the input port 1 of the plugin 805 and to register the connection in the child-graph 803 (step S145). In response to the port connection instruction, the path routing function unit 5 in the child-graph 803 performs path routing (step S146).

When the plugin 806 is a plugin including no delay, as discussed above, an error is detected and the detected error is notified as a result of the path routing by the path routing function unit 5, and the error warning function unit 9 warns the user with an error message. In response to the warning, the user inserts a delay element in front of or behind the plugin 806 in the feedback loop to resolve the error.

When the plugin 806 is a plugin including a delay, on the other hand, it is to be anticipated that no error is notified or no error warning is issued.

Finally, the user instructs the object of the child-graph 803 to connect output port 0 of the plugin 805 and the internal input port 0 (internal) of the child-graph 803 (user instruction (16)). Then, the child-graph 803 exercises the plugin interconnection processing function unit 3 to connect the output port 0 of the plugin 805 and the internal input port 0 (internal) of the child-graph 803 and to register the connection in the child-graph 803 (step S147). In response to the port connection instruction, the path routing function unit 5 in the child-graph 803 performs path routing (step S148).

The circuit shown in FIG. 8 is thus set up in the graph 800 according to the above-described procedure. When the user instructs the graph 800 to initiate signal processing, as discussed above, the plugins sequentially perform the signal processing according to the signal processing order determined by path routing.

As discussed above, in the signal processing apparatus according to the embodiment, since the total of 16 user steps in the procedure described above are performed on the graph objects, the graph structure of the circuit is changed each time the steps are performed. Therefore, the path routing algorithm is automatically performed by the system (graph) for each step. When the process for creating a circuit ends, the path routing also ends, and the signal processing order is determined.

The flow of performing signal processing on the created circuit shown in FIG. 8 will now be described.

The plugin generating and holding unit in the graph 800 holds plugins that are sorted in the optimum successive calculation order determined by the path routing algorithm. While assuming that plugins are stored in the graph 800 shown in FIG. 8 in the optimum order, the flow of performing signal processing will now be described.

(1) First, the user instructs the graph 800 to initiate signal processing.

(2) Then, the signal-processing function of the graph 800 is executed.

(3) Then, the signal-processing function of the plugin 801 is executed from within the signal-processing function of the graph 800.

(4) Then, the signal-processing function of the child-graph 803 is executed from within the signal-processing function of the graph 800.

(4-1) Then, the signal-processing function of the plugin 806 is executed from within the signal-processing function of the child-graph 803.

(4-2) Then, the signal-processing function of the plugin 804 is executed from within the signal-processing function of the child-graph 803.

(4-3) Then, the signal-processing function of the plugin 805 is executed from within the signal-processing function of the child-graph 803.

(5) Then, the signal-processing function of the plugin 802 is executed from within the signal-processing function of the graph 800.

In the flow of the process described above, only the processing of step (1) for instructing the graph 800 to initiate signal processing is performed in response to a user instruction, and the processing of steps (2) to (5) is automatically performed by the graph 800 and the child-graph 803.

Within the signal-processing function of each plugin, the following operations are performed:

(1) receiving input data from the input port;
(2) performing signal processing on the input data; and
(3) outputting the input data subjected to the signal processing to the output port.

Path Routing Algorithm of Embodiment

The path routing algorithm that is executed by the processing function of the graph according to this embodiment will now be described.

The following path routing algorithm builds the main part of the system according to the embodiment. The path routing algorithm allows the plugins included in the graph to be sorted in the optimum order. During signal processing, the unique signal-processing functions of the plugins are called and executed in the order in which the plugins are sorted.

In general, when signal processing is performed using a signal processing device, such as a digital signal processor (DSP), an arithmetic circuit unit in the DSP, such as an arithmetic logical unit (ALU), successively performs calculations to achieve the desired signal processing. This successive processing approach with the use of the DSP or the like is also applied to the arithmetic operation performed by a central processing unit (CPU) of the middleware according to this embodiment.

In this embodiment, a given circuit is regarded as a signal flow graph, the order of successive calculations is determined from the graph, and calculations are successively performed in the determined order. The SSP, which is an implementation of the middleware according to this embodiment, is also characterized by having a unique path routing algorithm.

The path routing algorithm allows any digital circuit including a feedback loop to be completely emulated. The path routing algorithm also allows the circuit structure to be dynamically changed, which is difficult in real-world hardware circuit environments.

The path routing algorithm according to this embodiment is an algorithm for determining the successive calculation order from which plugin to start signal processing in order to carry out the signal processing on a circuit composed of plugins joined to define a graph. The circuit to be subjected to path routing, which is set up in the graph, may include a feedback loop circuit.

This path routing algorithm is contained in the graph, and the plugin generating and holding unit in the graph executes the path routing algorithm.

When the user instructs the graph to change the graph structure, the graph itself automatically performs path routing, and determines the new successive calculation order. When a plurality of graphs are present inside a circuit, paths for the individual graphs are routed independently, and the path routing is performed only on the changed graph. This path routing is very simple and is completed in a short time.

The details of the path routing algorithm according to this embodiment will be described hereinbelow.

In the path routing algorithm according to this embodiment, plugins, which are circuit elements constituting a graph, are regarded as nodes. A node is an element constituting a node in graph theory. In this embodiment, a circuit can be represented by a directed-edge graph including nodes joined by directional arrowed links. An arrow directed to a node is defined as an input to the node, and an arrow directed to the outside from a node is defined as an output from the node. In the path routing algorithm according to this embodiment, the nodes joined to define a graph are traced forward to determine the signal order. The path routing algorithm according to this embodiment is hereinafter referred to as a "node-scan algorithm".

The node-scan algorithm is made up of an initial path routing algorithm (primary node-scan algorithm) as a basic path routing algorithm, and a loop search algorithm for routing a path further according to loop information.

Figure 13:
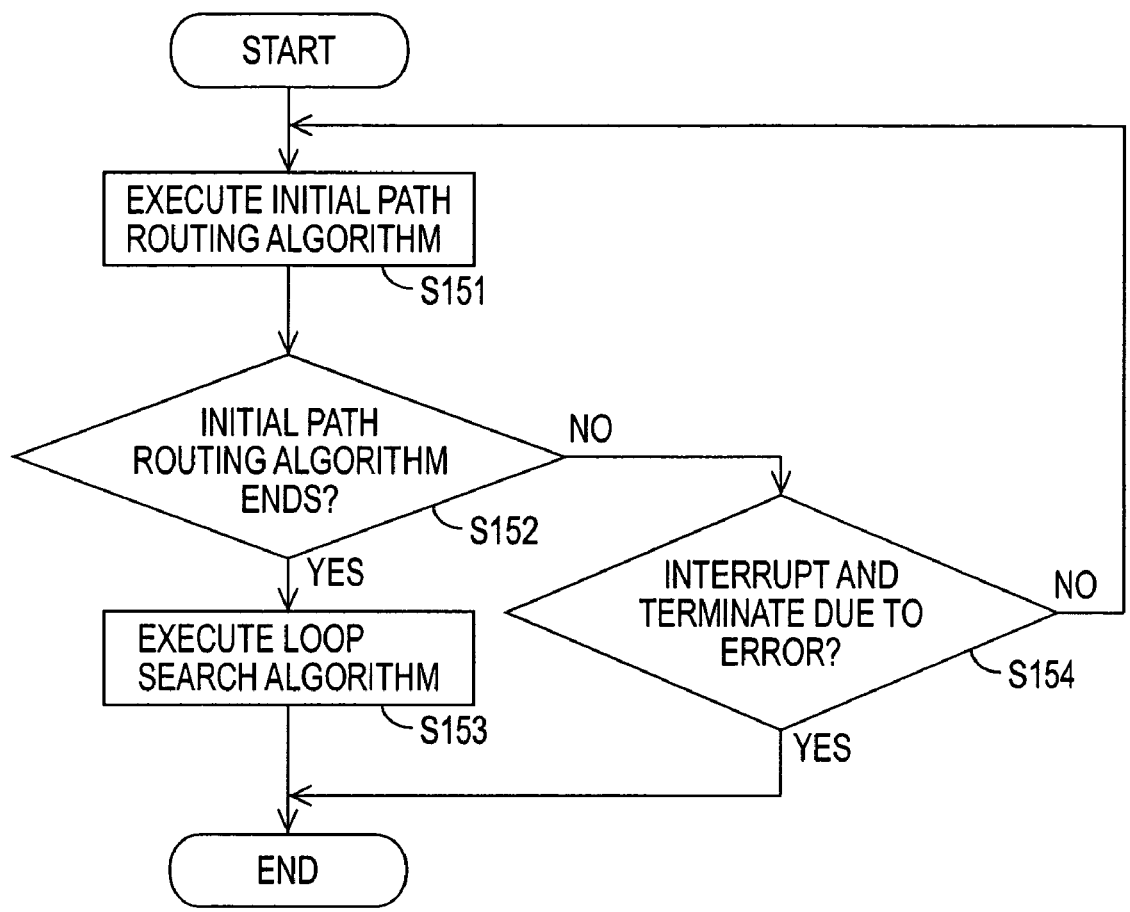
FIG. 13 is a flowchart showing a path routing algorithm for the signal processing apparatus according to the embodiment of the present invention.

In this embodiment, as shown in FIG. 13, in the node-scan algorithm, first, an initial path routing algorithm is executed (step S151). Then, it is determined whether or not the initial path routing algorithm has ended (step S152). If it is determined that the initial path routing algorithm has normally ended, a loop search algorithm is executed (step S153). Then, the path routing algorithm ends.

If it is determined in step S152 that the initial path routing algorithm has not ended, as discussed above and discussed in detail below, it is determined whether or not the initial path routing algorithm has been interrupted and terminated due to an error caused by inserting a plugin including no delay in the feedback loop (step S154).

If it is determined in step S154 that the initial path routing algorithm has not been terminated, the flow returns to step S151, and the initial path routing algorithm continues. If it is determined in step S154 that the initial path routing algorithm has been terminated, the path routing algorithm ends.

Initial Path Routing Algorithm

The initial path routing algorithm is executed under the search conditions described below after setting the following propositional problem to be solved:

Propositional Problem to be Solved:

Assume that the nodes joined to define a graph are traced forward. Pass through all nodes at one time in one cycle under the conditions below. Determine the cyclic order that satisfies this requirement, where the nodes to be traced are not necessarily directly joined by graph edges and the nodes may be skipped and traced.

Search Conditions:

(a) The path can unconditionally pass through a node having no input.

(b) The path can unconditionally pass through a node of a plugin constituting a delay element.

(c) An output of a passed node is defined.

(d) An input of a node A is defined once an output of a preceding node B connected to the input of the node A is defined.

(e) If all inputs of a given node are defined, then, the path can pass the given node.

The nodes are assigned in advance unique numbers as identifiers in order. These numbers are hereinafter referred to as "node numbers (node Nos.)". The node numbers may be arbitrary numbers, and, for example, node numbers may be assigned in the order in which the objects of the plugins are generated. There are two types of plugins, i.e., latency-type plugins (LTPs) and non-latency-type plugins (NLTPs). LTPs are plugins constituting delay elements that cause a delay of one or more samples. NLTPs are plugins constituting gate elements that do not cause a delay.

The initial path routing algorithm is repeatedly performed in the second cycle, the third cycle, and so on to check the nodes until the solution of the propositional problem is found. In a cycle of routing a path, at least one node through which the path can pass (hereinafter referred to as a "passable node") is found.

However, there is an exception. That is, in a cycle of routing a path, no passable node is found if an LTP constituting a delay element is not included in a feedback loop. This is abnormal in the circuit structure.

In the general principle of digital signal processing, it is necessary to include at least one or more delay elements in a feedback loop to satisfy the causality constraint. The initial path routing algorithm according to this embodiment is characterized in that the exception occurs when a user creates a circuit that does not satisfy this basic principle.

In the initial path routing algorithm according to this embodiment, the occurrence of the exception is used to warn the user of an error. When a user creates a feedback circuit including no delay element, the above-described exception of routing occurs in the initial path routing algorithm. When this exception is detected, the system warns the user so that he/she can reconfigure a circuit.

Figure 14:
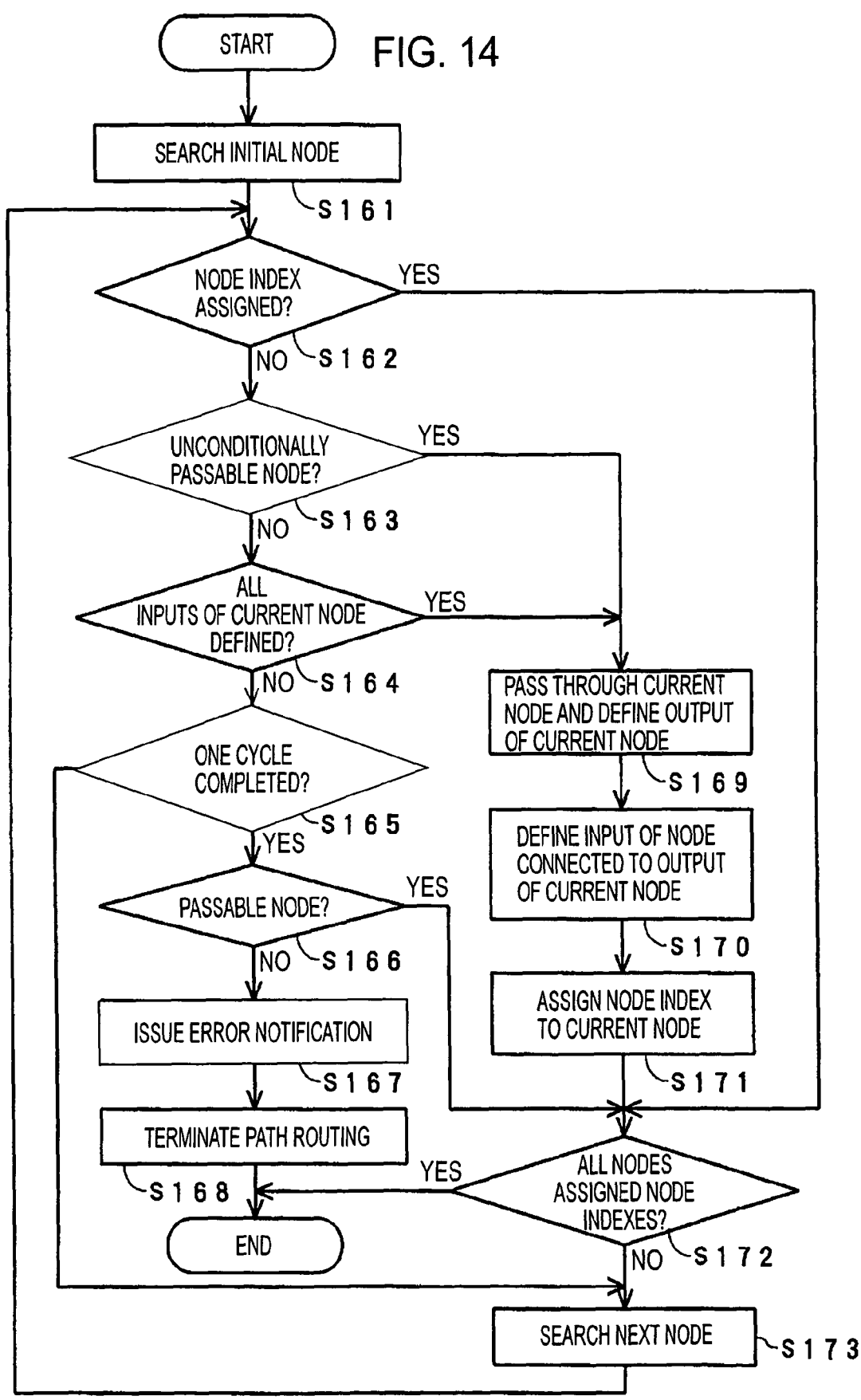
FIG. 14 is a flowchart showing an initial path routing algorithm constituting a portion of the path routing algorithm for the signal processing apparatus according to the embodiment of the present invention.

The initial path routing algorithm described above can be executed according to a flowchart shown in FIG. 14.

First, the first node is checked (step S161), and it is determined whether or not the current node has been assigned a node sequence number (hereinafter referred to as a "node index") (step S162). If the node index has been assigned, it is determined whether or not all nodes have been assigned node indexes (step S172). If it is determined that all nodes have been assigned node indexes, this processing routine ends.

If it is determined in step S172 that all nodes have not been assigned node indexes, the next node is checked (step S173). Then, the flow returns to step S162, and the processing after step S162 is repeatedly performed.

If it is determined in step S162 that the current node has not been assigned a node index, it is determined whether or not the current node is a node through which the path can unconditionally pass, i.e., whether or not the current node is an LTP (step S163).

If it is determined in step S163 that the current node is not a node through which the path can unconditionally pass, it is determined whether or not all inputs of the current node are defined (step S164). If it is determined in step S164 that all inputs are not defined, it is determined whether or not a cycle of path routing is completed (step S165).

If it is determined in step S165 that a cycle of path routing is not completed, the next node is checked (step S173). Then, the flow returns to step S162, and the processing after step S162 is repeatedly performed.

If it is determined in step S165 that a cycle of path routing is completed, it is determined whether or not a passable node is found (step S166). If it is determined in step S166 that there is found any passable node, it is determined whether or not all nodes have been assigned node indexes (step S172). If it is determined that there is any node that has not been assigned a node index, the next node is checked (step S173). Then, the flow returns to step S162, and the processing after step S162 is repeatedly performed. If it is determined in step S172 that all nodes have been assigned node indexes, this processing routine ends.

If it is determined in step S166 that there is found no passable node, an error due to no delay element included in the feedback loop is detected, and an error notification is generated and issued (step S167). Then, the path routing using the initial path routing algorithm is terminated (step S168), and this processing routine ends.

If it is determined in step S163 that the current node is a node through which the path can unconditionally pass or if it is determined in step S164 that all inputs of the current node are defined, the path passes through the current node, and the output of the current node is defined (step S169). Then, the input of the node to which the current node is connected is defined (step S170). The current node is then assigned a node index (step S171).

It is determined whether or not all nodes have been assigned node indexes (step S172). If it is determined that there is any node that has not been assigned a node index, the next node is checked (step S173). Then, the flow returns to step S162, and the processing after step S162 is repeatedly performed. If it is determined in step S172 that all nodes have been assigned node indexes, this processing routine ends.

In this way, an error due to no delay element included in the feedback loop is detected and an error notification is sent to the error warning function unit 9, as described above. In response to the error notification, the error warning function unit 9 warns the user with the error message described above.

Figure 15:
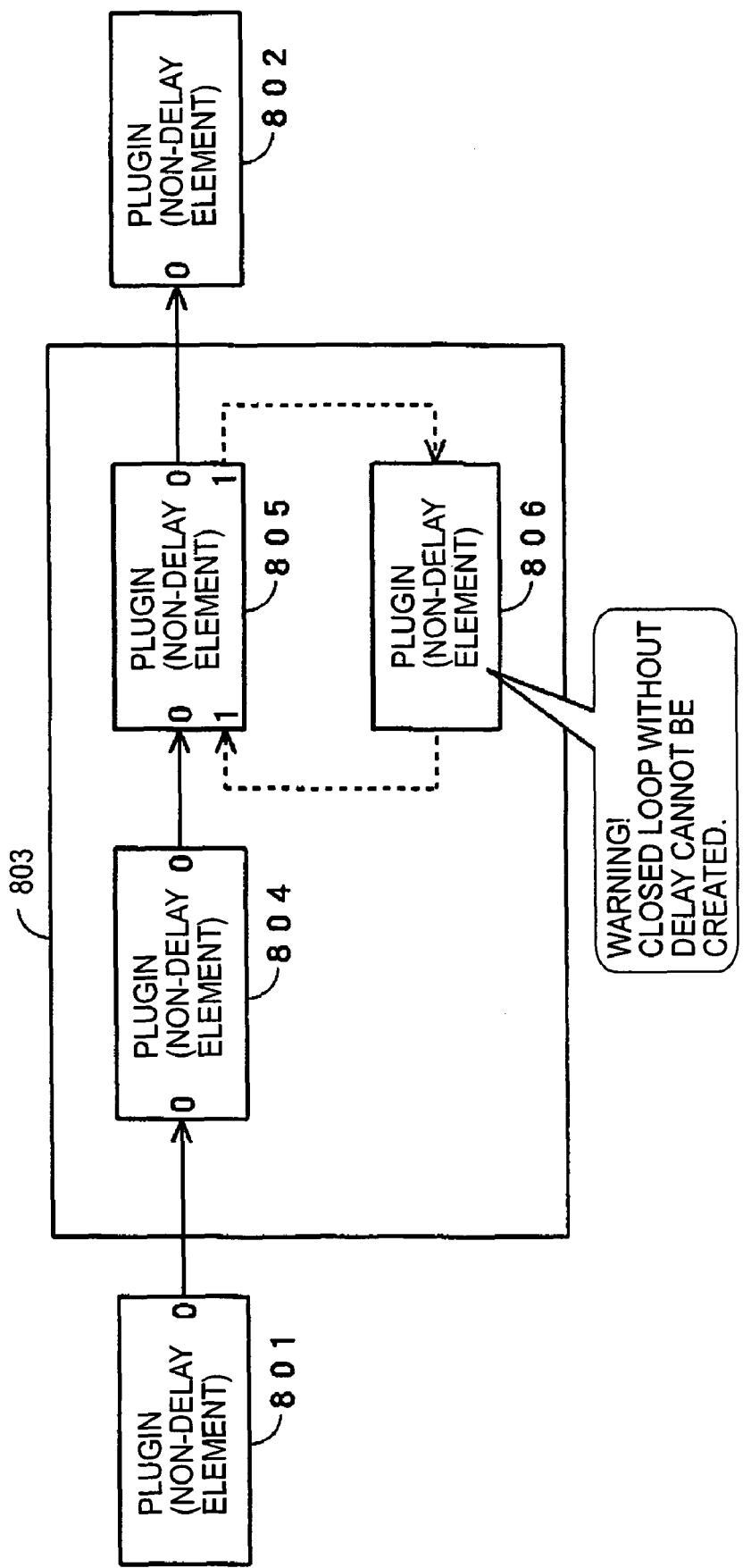
FIG. 15 is a diagram showing the main portion of the signal processing apparatus according to the first embodiment of the present invention.

For example, as shown in FIG. 15, if a plugin constituting a non-delay element (NLTP) is accidentally connected as the plugin 806, as indicated by broken lines, to create a feedback loop, a warning message shown in FIG. 15 is displayed on the screen.

In response to the warning message, the user modifies the feedback loop so as to insert a delay element in the feedback loop or replace one of the NLTPs in the feedback loop with an LTP. In the next step of executing the path routing algorithm, the error message does not appear.

Figure 16:
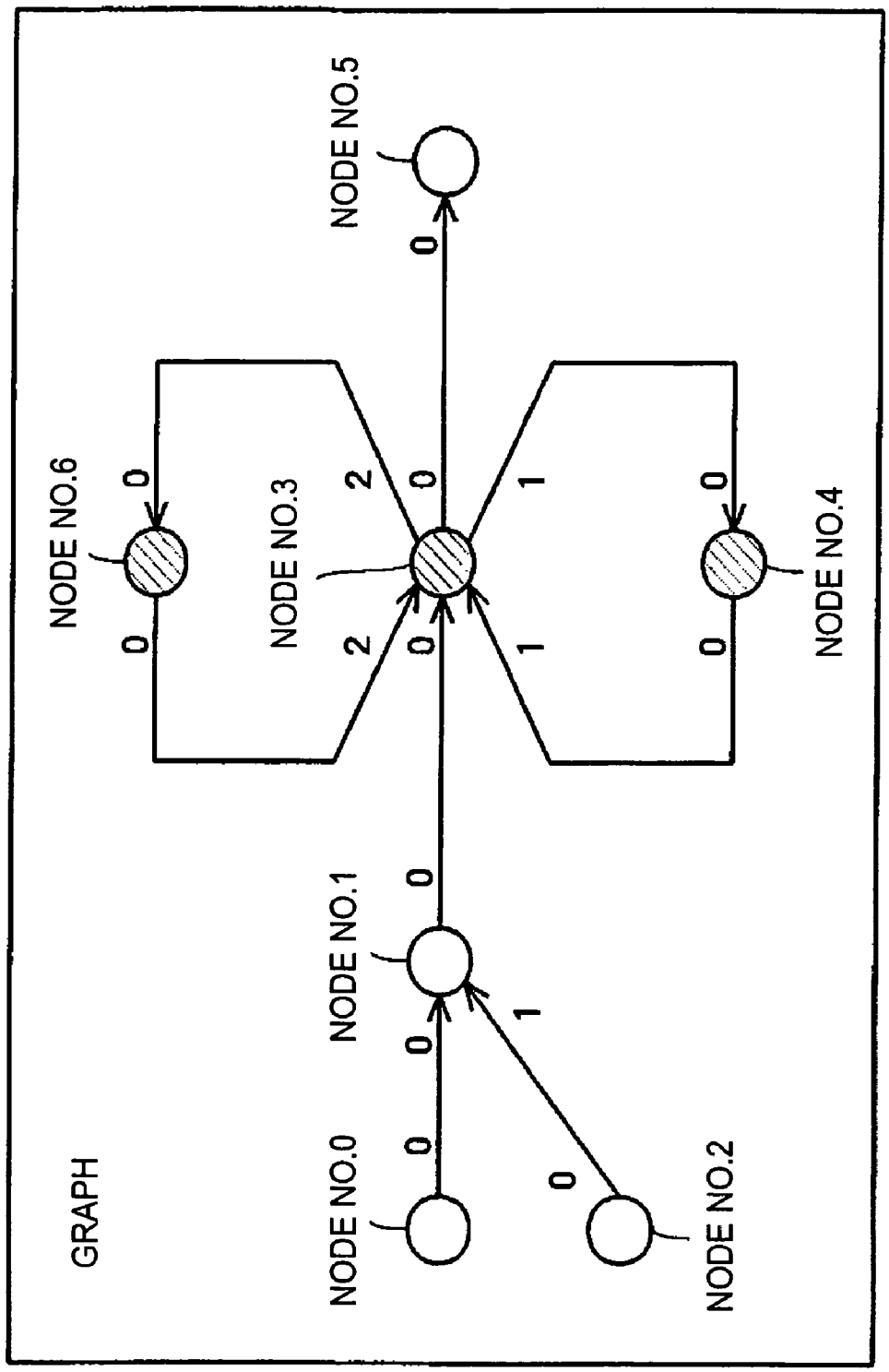
FIG. 16 is a diagram showing an initial path routing algorithm constituting a portion of a path routing algorithm for the signal processing apparatus according to the embodiment of the present invention.

A specific example assignment of node indexes based on the initial path routing algorithm will be described with reference to a circuit structure of a flag shown in FIG. 16. In FIG. 16, seven nodes, i.e., nodes No. 0 to No. 6, are target nodes. The nodes No. 4 and No. 6 are LTPs. In the initial path routing algorithm, the nodes No. 0 to No. 6 are checked in turn as below. This check is repeatedly performed in multiple cycles of the nodes No. 0 to No. 6 until all nodes become passable nodes.

(1) The node No. 0 has no input and is therefore a passable node. The output (0) of the node No. 0 is thus defined.

(2) The node No. 1 is skipped because the input (1) is undefined.

(3) The node No. 2 has no input and is therefore a passable node. The output (0) of the node No. 2 is thus defined.

(4) The node No. 3 is skipped because all inputs (0, 1, and 2) are undefined.

(5) The node No. 4 is an LTP and is therefore a passable node. The output (0) of the node No. 4 is thus defined.

(6) The node No. 5 is skipped because the input (0) is undefined.

(7) The node No. 6 is an LTP and is therefore a passable node. The output (0) of the node No. 6 is thus defined.

The first cycle of path routing is completed. Then, the second cycle of path routing is performed as below on the nodes through which the path does not pass and of which outputs are undefined.

(1) The node No. 1 becomes a passable node because all inputs (0 and 1) are defined. The output (0) of the node No. 1 is thus defined.

(2) The node No. 3 becomes a passable node because all inputs (0, 1, and 2) are defined. The outputs (0, 1, and 2) of the node No. 3 are thus defined.

(3) The node No. 5 becomes a passable node because the input (0) is defined. The node No. 5 is thus defined.

Since the path passes through all nodes and the output is defined, the path routing operation is completed. In this case, routing is completed in the second cycle.

Routing Result of Initial Path Routing Algorithm

In the routing steps of the initial path routing algorithm, the nodes are numbered in the order in which the outputs are defined, and a routing result is determined. These new sequence numbers of the nodes are node indexes. FIG. 17 shows a routing result for the example circuit structure of the graph shown in FIG. 16.

In the graph, the plugins are stored in the order of the node indexes in the plugin creating and holding unit. Each time the path routing algorithm is executed, the order of the plugins stored in the plugin creating and holding unit is updated. During signal processing, the graph calls the signal-processing functions of the plugins in the order of the node indexes, thereby achieving the desired signal processing.

In the foregoing description, an error notification is issued in the initial path routing algorithm. However, an error notification may not be issued in the initial path routing algorithm, and may be issued as a portion of the path routing algorithm shown in FIG. 13 when the termination of the initial path routing algorithm is detected in the path routing algorithm shown in the flowchart of FIG. 13.

Loop Search Algorithm

Next, the loop search algorithm will be described. The loop search algorithm provides an improvement of a load on the CPU during signal processing. This technique is important to maintain high real-time signal processing.

A desired signal processing circuit is achievable by using a routing result determined in the initial path routing algorithm. However, the routing result determined in the initial path routing algorithm is not necessarily advantageous for a circuit structure including a feedback loop in view of the speed and performance.

A circuit structure including a feedback loop needs to satisfy the causality constraint in the principle of digital signal processing that outputs cannot be defined unless inputs are defined. In a circuit including a feedback loop, therefore, it is necessary to successively perform signal processing on the plugins on a sample-by-sample basis. That is, it is necessary to input and output audio data with respect to the plugins and perform signal processing on the audio data on a sample-by-sample basis.

A problem is the number of function calls needed each time the signal processing is performed. In general, in software processing, function calling leads to increases the load on the CPU (and is thus costly). In software-based real-time signal processing, the fewer the function calls, the higher the processing speed and performance. A method for reducing the number of function calls is needed to increase the processing speed and performance.

A typical method for reducing the number of function calls is to perform processing on a unit-by-unit basis, wherein each unit consists of a plurality of data samples, e.g., on a packet-by-packet basis. Instead of processing on a sample-by-sample basis, a block consisting of a predetermined number of data samples is processed in a batch. For example, when the packet size is 1,024 samples, a block of 1,024 samples of audio data is processed by a single function call. By doing so, the number of function calls can be reduced.

However, if a circuit includes a feedback loop, as discussed above, function calling is needed on a sample-by-sample basis. In this case, packet-based processing is not carried out.

In the path routing algorithm according to this embodiment, this problem is overcome by performing the loop search algorithm, described below, after performing the initial path routing algorithm.

In a circuit including a feedback loop, nodes forming the loop are generally parts of the circuit. The loop search algorithm according to this embodiment uses this fact to separate a group of nodes forming the loop (hereinafter referred to as "loop nodes") and a group of nodes not forming the loop (hereinafter referred to as "non-loop nodes") with respect to the signal processing order, and enables packet-based processing on the group of non-loop nodes, thereby entirely increasing the signal processing speed.

For example, in the circuit structure shown in FIG. 16, three nodes, i.e., the nodes No. 3, No. 4, and No. 6, form a loop, and are less than half of the total of seven nodes.

Only the loop nodes are processed on a sample-by-sample basis, while the remaining nodes are processed on a packet-by-packet basis, to thereby prevent the deterioration in speed. In the overall circuit structure, the smaller the ratio of the loop nodes, the more efficiently the deterioration in speed can be prevented.

Figure 18:
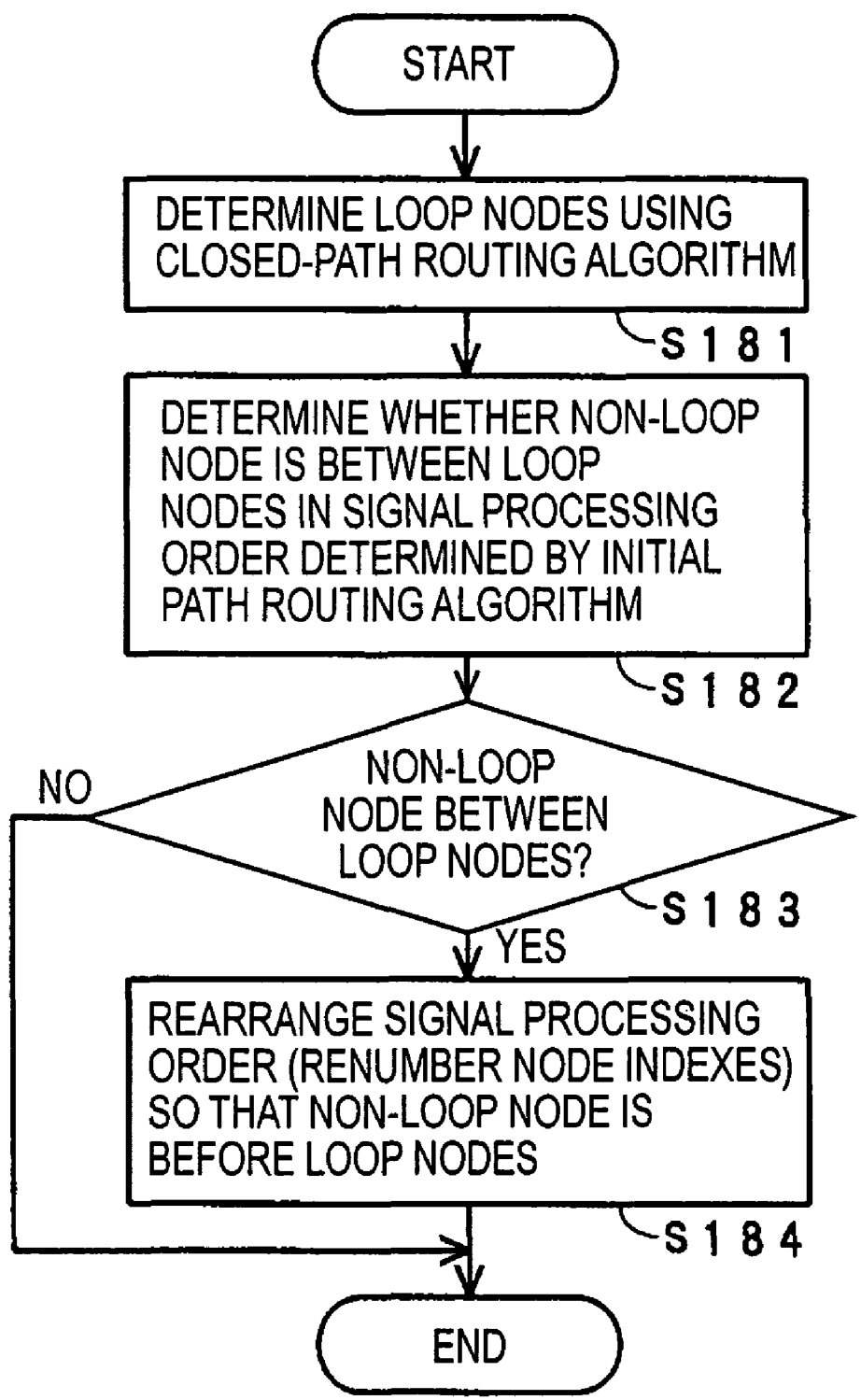
FIG. 18 is a flowchart showing a loop search algorithm constituting a portion of the path routing algorithm for the signal processing apparatus according to the embodiment of the present invention.

FIG. 18 is a flowchart showing the loop search algorithm. First, a closed-path routing algorithm is used to determine loop nodes (step S181). The closed-path routing algorithm may employ a closed-path routing algorithm in general graph theory. The closed-path routing algorithm in the general graph theory is known, and a detailed description thereof is thus omitted.

It is determined whether or not a non-loop node is located between loop nodes in the signal processing order determined in the initial path routing algorithm (step S182).

If it is determined that a non-loop node is located between loop nodes in the signal processing order (step S183), the signal processing order is rearranged so that the non-loop node is placed before the loop nodes (step S184). That is, the node indexes are renumbered.

If it is determined in step S183 that no non-loop node is located between loop nodes in the signal processing order, this loop search algorithm ends.

The loop search algorithm will be described hereinafter in detail in the context of the application to the circuit structure shown in FIG. 16.

A result of the initial path routing algorithm executed for the circuit structure shown in FIG. 16 is shown in FIG. 17. A table viewed in the left portion of FIG. 19 shows that the loop nodes determined by the closed-path routing algorithm, i.e., the nodes No. 3, No. 4, and No. 6, are shaded in the routing result shown in FIG. 17.

Figure 19:
FIG. 19 is a diagram showing the loop search algorithm constituting a portion of the path routing algorithm for the signal processing apparatus according to the embodiment of the present invention.

As is apparent from the table viewed in the left portion of FIG. 19, the node No. 1, which is a non-loop node, is located between loop nodes in the signal processing order in the routing result of the initial path routing algorithm. In this case, the node No. 1 in the signal processing order is also to be processed on a sample-by-sample basis although the processing on a sample-by-sample basis is not needed.

When applying the loop search algorithm, in step S184, the signal processing order is changed so that the non-loop node is placed before the loop nodes.

When the signal processing order is changed, it is still necessary to satisfy the propositional problem to be solved in the initial path routing algorithm. In the loop search algorithm, it may be determined whether or not the propositional problem to be solved in the initial path routing algorithm is satisfied for the changed signal processing order when the signal processing order is changed. In this example, however, the signal processing order is changed so that the non-loop node is placed before the first loop node, and the above-described determination is not needed. This changing approach is advantageous in that the sequence of the signal processing is correctly maintained.

In the context of the example shown in FIG. 16, since the nodes No. 4 and No. 6 are LTPs, inherently, the outputs are defined if the inputs are undefined. With this inherent feature, the nodes No. 4 and No. 6 may be processed after the node No. 1.

In this example, the loop search algorithm allows, as viewed in the right portion of FIG. 19, the signal processing order to be changed so that the node No. 1, which is a non-loop node, is moved to the third position in the signal processing order, before the node No. 4, which is the first loop node.

As indicated by shading in the right portion of FIG. 19, the loop nodes are grouped. That is, the group of loop nodes is localized in the signal processing order.

Signal processing is performed in the signal processing order viewed in the right portion of FIG. 19 according to the following procedure to minimize the number of function calls:

(1) The nodes with node indexes 1 to 3 are outside the loop, and are therefore processed on a packet-by-packet basis.

(2) The nodes with node indexes 4 to 6 reside in the loop, and are therefore processed on a sample-by-sample basis.

(3) The node with node index 7 is outside the loop, and is therefore processed on a packet-by-packet basis.

By performing signal processing in this way, the number of function calls is reduced to prevent the deterioration in signal processing speed. Next, the number of function calls in a case where the packet size is 1,024 samples will be described.

(1) 1,024 samples of data are transferred to the node No. 0 for processing (one function call).

(2) 1,024 samples of data are transferred to the node No. 2 for processing (one function call).

(3) 1,024 samples of data are transferred to the node No. 1 for processing (one function call).

(4) The following operations (4-1) to (4-3) are repeatedly performed 1,024 times (3×1,024 function calls).

(4-1) One sample of data is transferred to the node No. 4 for processing (one function call).

(4-2) One sample of data is transferred to the node No. 6 for processing (one function call).

(4-3) One sample of data is transferred to the node No. 3 for processing (one function call).

(5) 1,024 samples of data are transferred to the node No. 5 for processing (one function call).

In the signal processing steps (1) to (5) described above, a total of 3,076 function calls are needed to perform signal processing on 1,024 samples.

In this example, if all nodes are processed on a sample-by-sample basis, a total of 7,168 function calls are needed. The node-scan algorithm according to the embodiment is executed to localize a group of loop nodes, and function calling per sample is performed for the group of loop nodes while performing function calling one time for the remaining non-loop nodes on a packet-by-packet basis. Thus, the number of function calls can be reduced by about 57%.

The system according to this embodiment may not fix the packet size but may dynamically change the packet size.

Dynamic Change of Circuit Structure

As discussed above, the signal processing apparatus according to this embodiment can dynamically change the graph structure even during signal processing in response to a graph change instruction from a user. Even during signal processing, the path routing algorithm (node-scan algorithm) according to this embodiment is re-executed to support the change of the circuit structure.

This arrangement allows a user to change the signal processing apparatus according to this embodiment to a new circuit structure while, for example, listening to the sound processed and output from the signal processing apparatus according to this embodiment. Thus, advantageously, the signal processing apparatus according to this embodiment can be applied to equipment for live performance applications.

Figure 20:
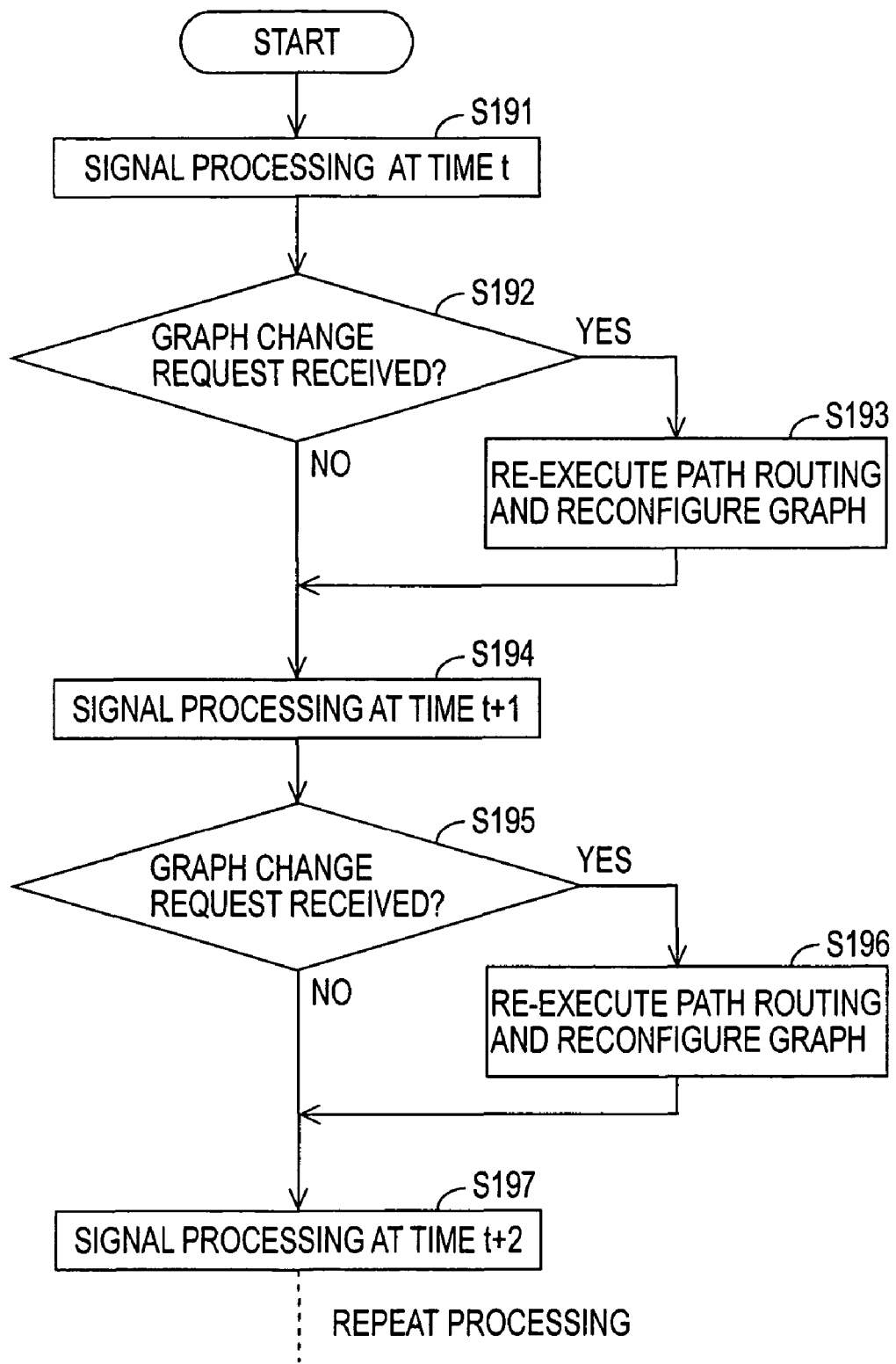
FIG. 20 is a flowchart showing a process for dynamically changing the circuit structure for the signal processing apparatus according to the embodiment of the present invention.

FIG. 20 is a flowchart showing this dynamic changing process. This flowchart is executed by a graph.

First, signal processing is performed at time t (step S191). Then, it is determined whether or not a graph change request, such as an instruction to generate or delete a plugin or an instruction to generate or connect an input port and an output port, has been received during the signal processing (step S192).

If it is determined in step S192 that a graph change request has been received, the graph re-executes path routing, and reconfigures the circuit structure of the graph (step S193). Then, signal processing at next time (t+1) is performed (step S194). If it is determined in step S192 that no graph change request has been received, then, signal processing at next time (t+1) is performed (step S194).

After step S194, processing similar to the processing of steps S192 to S193 is repeatedly performed (e.g., steps S195 to S196).

In this dynamic changing process, the path routing algorithm using the flowcharts shown in FIGS. 13 and 14 is also executed in the path routing processing in steps S193, S196, and so forth. Like the example described above, if a feedback loop including no delay is accidentally added, an error warning is given to the user.

In response to the error warning, the user can easily create a correct circuit by inserting a delay element in the feedback loop or changing a plugin from an NLTP to an LTP.

Real-Time Distribution Process

The above-described signal processing apparatus according to the embodiment is normally implemented by a single computer, and signal processing is performed on the single computer. This processing is extensively performed on a plurality of computers connected via a network, thereby distributing the CPU load in real time.

This distribution processing is achievable by utilizing a distributed object technology, which is a general computing technology, such as COM/DCOM (Component Object Model/Distributed Component Object Model) or CORBA (Common Object Request Broker Architecture).

A distribution processing will be described hereinbelow in the context of the COM/DCOM technology, which is mainly used in Windows® OSs. First, all plugin objects in the middleware of this embodiment are implemented as COM objects. A COM object is an object-oriented component model, and is characterized by location transparency. The location transparency is a feature that allows a COM object to be generated on a remove computer as if the COM object were generated on, for example, a local computer.

With the location transparency, objects are generated on either a local computer or a remote computer by performing the same operation. That is, plugin objects, which are COM objects, are uniformly generated on a plurality of computers without paying attention to networks. Operations other than the generation of plugins are also achievable with uniform operability on either a local computer or a remote computer.

For example, audio input and output plugin objects may be placed on a local computer, and echo plugin objects may be placed on a remote computer. As a whole, a single circuit can be set up.

Figure 21:
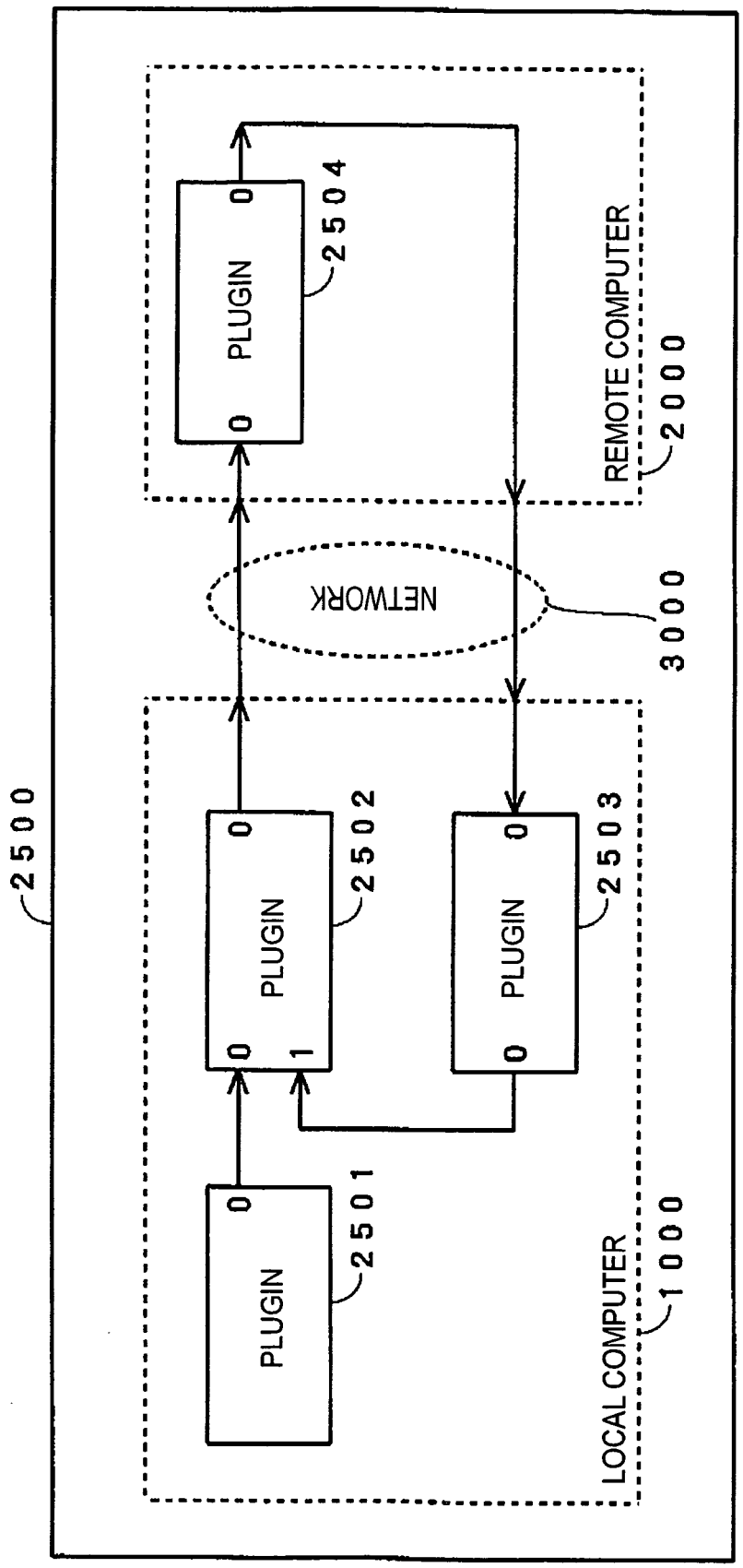
FIG. 21 is a diagram showing real-time distribution processing for the signal processing apparatus according to the embodiment of the present invention.

FIG. 21 shows an exemplary graph to be subjected to real-time distribution processing. In the example shown in FIG. 21, in an environment where a local computer 1000 and a remote computer 2000 are connected via a network 3000, a root graph 2500 is defined and a circuit is created.

The flow of creating a circuit will now be described with reference to FIG. 21. A user creates a circuit in a similar manner to that for creating a circuit using only the local computer 1000. The user draws attention to the remote computer 2000 only in a portion of the processing.

(1) The user creates an object of the graph 2500. The object of the graph 2500 is created on the local computer 1000.

(2) The user instructs the object of the graph 2500 to create an object of a plugin 2501.

(3) The user instructs the object of the graph 2500 to create an object of a plugin 2502.

(4) The user instructs the object of the graph 2500 to create an object of a plugin 2503. In this case, the plugin-generation functions are assigned an identifier of the remote computer 2000.

(5) The user instructs the object of the graph 2500 to create an object of a plugin 2504.

(6) The user instructs the object of the graph 2500 to connect output port 0 of the plugin 2501 and input port 0 of the plugin 2502.

(7) The user instructs the object of the graph 2500 to connect output port 0 of the plugin 2502 to input port 0 of the plugin 2503.

(8) The user instructs the object of the graph 2500 to connect output port 0 of the plugin 2503 and input port 0 of the plugin 2504.

(9) The user instructs the object of the graph 2500 to connect output port 0 of the plugin 2504 and input port 1 of the plugin 2502.

Thus, the circuit is completed. The user draws attention to the remote computer 2000 only in the step (4). Further, the user can perform the signal processing in a similar manner to that with the use of only the local computer 1000.

Second Embodiment

A signal processing apparatus according to a second embodiment of the present invention is basically similar in structure to that according to the first embodiment. The difference is that, when a feedback loop including no delay is generated, in the first embodiment, an error warning is issued to the user, whereas, in the second embodiment, a necessary delay element is automatically inserted in the feedback loop without issuing an error warning or after issuing an error warning.

In the second embodiment, it may be preset whether or not an additional delay element is automatically inserted, and, if an additional delay element is automatically inserted, the amount of delay of the additional delay element and the additional insertion position of the delay element may be preset.

Figure 22:
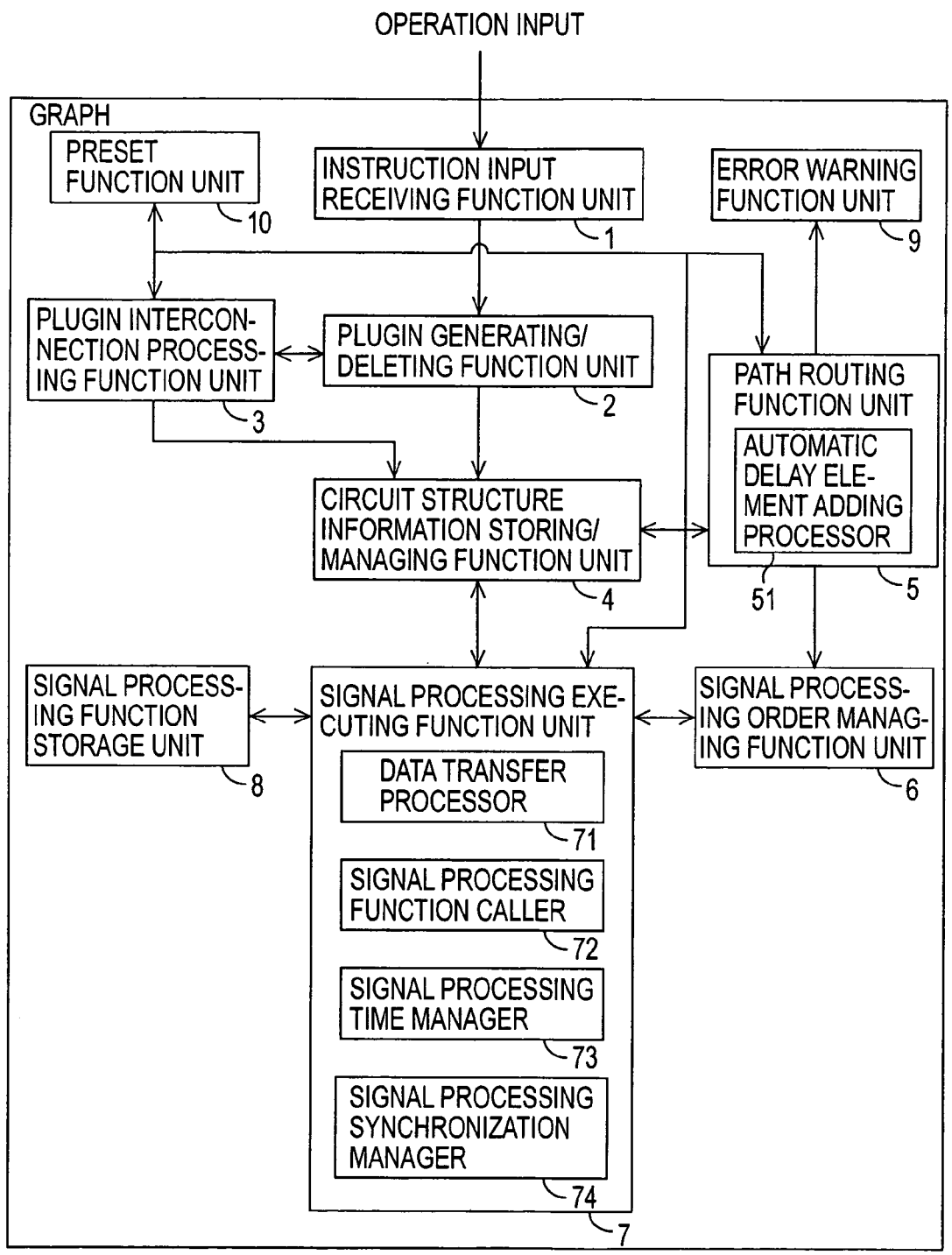
FIG. 22 is a functional block diagram of a signal processing apparatus according to a second embodiment of the present invention.

FIG. 22 is a functional block diagram of the signal processing apparatus according to the second embodiment, showing a graph structure in which the functions of a graph are represented by blocks. Like the first embodiment, the graph includes an instruction input receiving function unit 1, a plugin generating and deleting function unit 2, a plugin interconnection processing function unit 3, a circuit structure information storing and managing function unit 4, a path routing function unit 5, a signal processing order managing function unit 6, a signal processing executing function unit 7, a signal processing function storage unit 8, and an error warning function unit 9. The graph further includes a preset function unit 10.

As shown in FIG. 22, the path routing function unit 5 in the second embodiment includes an automatic delay element adding processor 51 as functional means.

The preset function unit 10 receives from the user a preset setting as to whether or not an additional delay element is automatically inserted, a preset amount of delay of an additional delay element to be automatically inserted, and a preset additional insertion position of the delay element, and holds these preset settings.

When the path routing function unit 5 detects a created feedback loop including no delay, the automatic delay element adding processor 51 of the path routing function unit 5 adds the delay element having the amount of delay that is preset and stored in the preset function unit 10 in the feedback loop at the additional insertion position that is preset and stored in the preset function unit 10.

Figure 23:
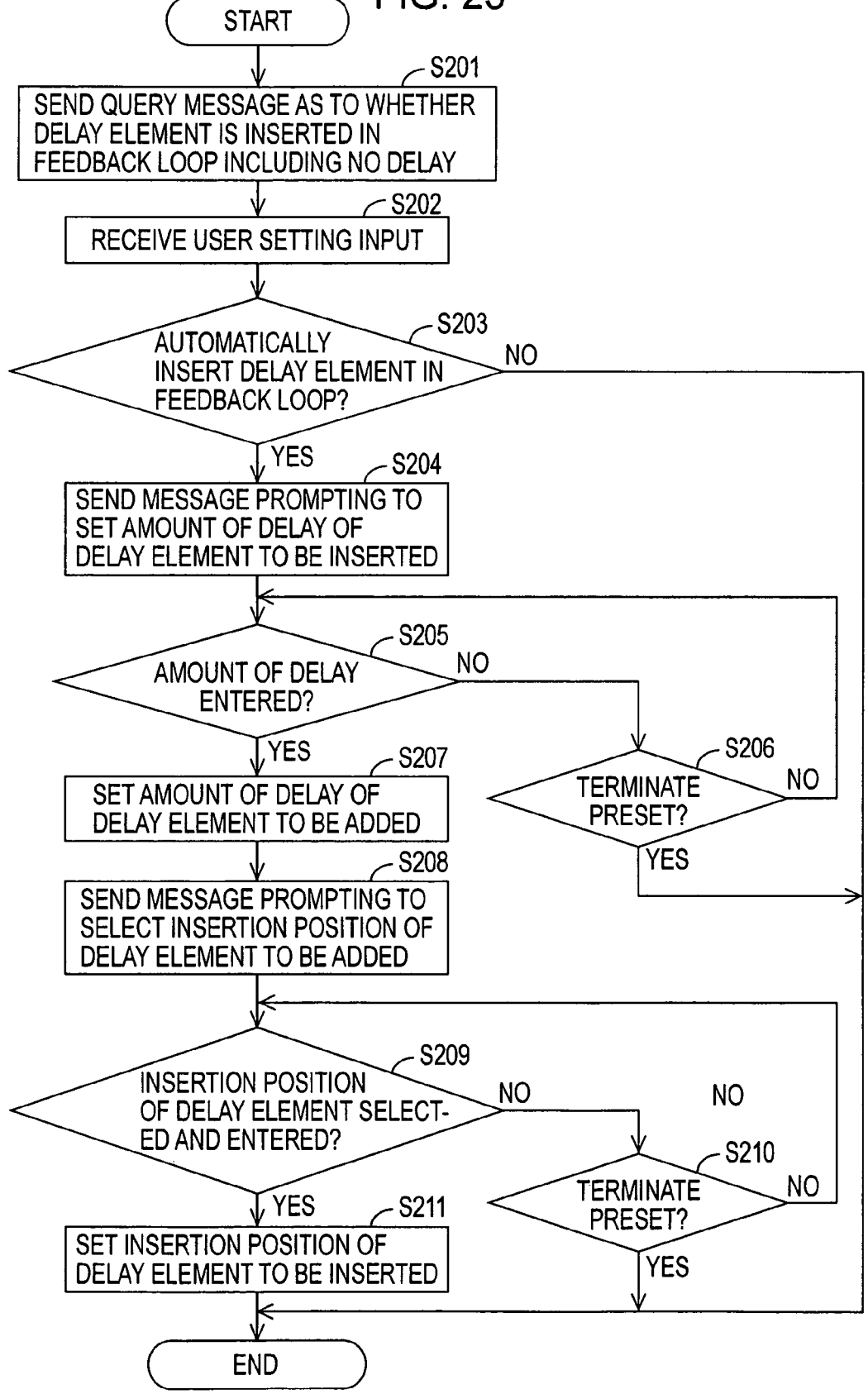
FIG. 23 is a flowchart showing an exemplary main operation of the signal processing apparatus according to the second embodiment shown in FIG. 22.

FIG. 23 is a flowchart showing an exemplary presetting operation of the preset function unit 10. When the user selects the preset setting function, the graph activates the preset function unit 10.

First, the preset function unit 10 sends a query message to the user as to whether or not an additional delay element is automatically inserted when a feedback loop including no delay is generated (step S201). In response to the query message, the user sets a preset as to whether or not an additional delay element is automatically inserted.

The preset function unit 10 receives the preset input from the user (step S202), and determines whether or not the preset specifies that an additional delay element is automatically inserted (step S203). If it is determined in step S203 that the preset does not specify that an additional delay element is automatically inserted, the preset function unit 9 ends this preset processing routine.

If it is determined in step S203 that the preset specifies that an additional delay element is automatically inserted, a message prompting to set the amount of delay of the delay element to be inserted is sent (step S204). Then, the flow waits for the user to set the amount of delay (step S205). If it is determined that the amount of delay is not set and the operation of terminating this presetting flow is performed (step S206), this preset processing routine ends.

If it is determined in step S205 that the amount of delay is set, the preset function unit 10 holds the set amount of delay as the amount of delay of the delay element to be additionally inserted (step S207).

Then, the preset function unit 10 sends a message prompting to select an insertion position of the delay element to be additionally inserted (step S208). Two insertion position options, e.g., positions in front of (output side) and behind (input side) a plugin (NLTP) in the feedback loop, are presented to the user.

In response to the prompt, the user selects either position in front of or behind the plugin in the feedback loop as an additional insertion position at which to insert the delay element. The preset function unit 10 monitors the selection input of the user (step S209).

Then, it is determined whether or not the operation of terminating this presetting flow is performed without receiving the selection input of the additional insertion position of the delay element (step S210). If it is determined that the operation of terminating the presetting flow is performed, this preset processing routine ends. If it is determined that the operation of terminating the presetting flow is not performed, the flow returns to step S209 and waits for the selection input of the additional insertion position of the delay element.

If the selection input of the additional insertion position of the delay element is received in step S209, the preset function unit 10 holds the additional insertion position of the delay element set by the user (step S211). Then, the preset processing routine ends.

Figure 24:
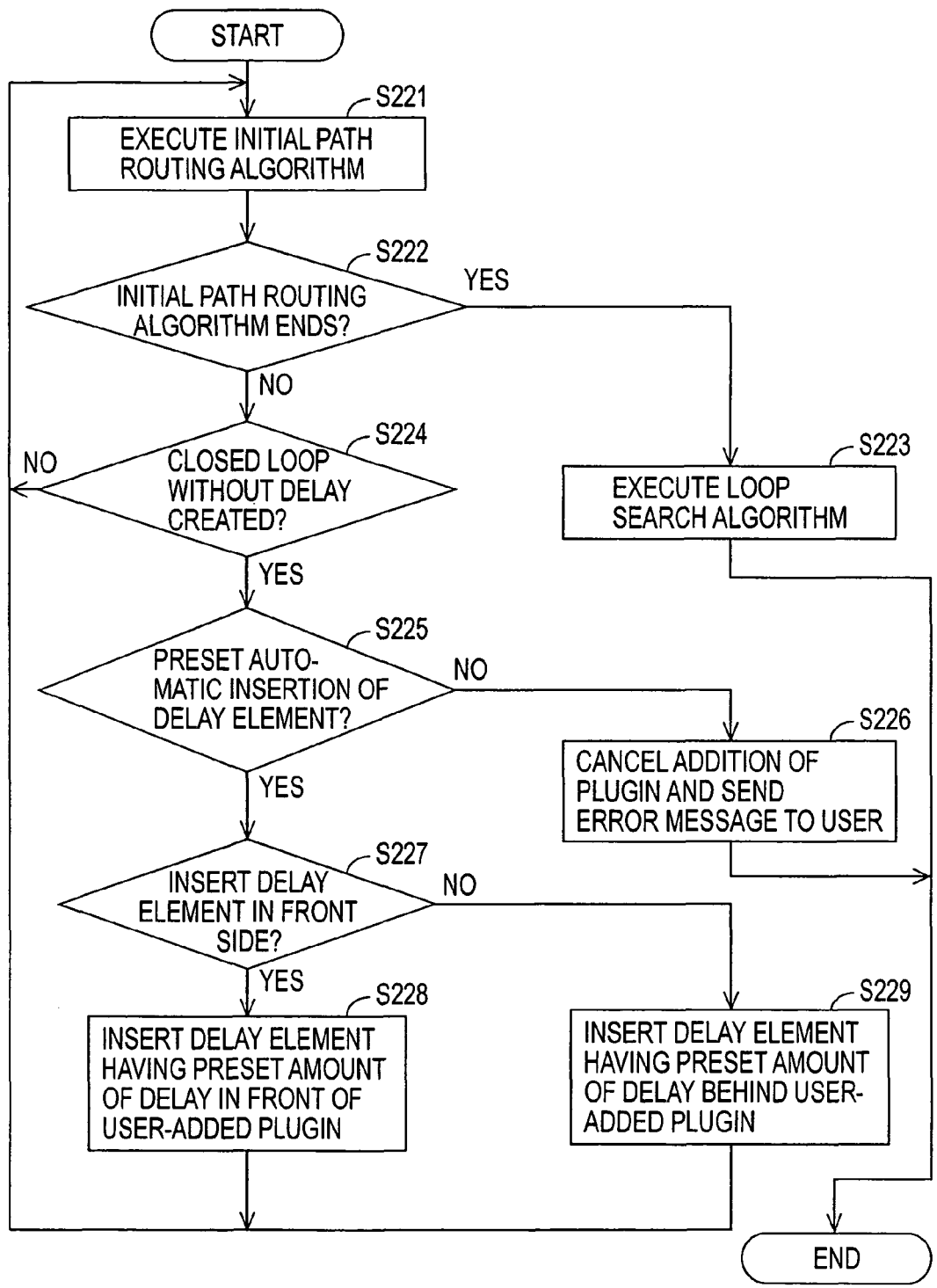
FIG. 24 is a flowchart showing an exemplary main operation of the signal processing apparatus according to the second embodiment shown in FIG. 22.

FIG. 24 is a flowchart showing a process for re-executing path routing, such as the processing of steps S193, S196, and so forth in the dynamic changing process shown in FIG. 20, according to the second embodiment.

First, the path routing function unit 5 executes an initial path routing algorithm (step S221). Then, it is determined whether or not the initial path routing algorithm has ended (step S222). If it is determined that the initial path routing algorithm has normally ended, a loop search algorithm is executed (step S223). Then, the path routing algorithm ends.

If it is determined in step S222 that the initial path routing algorithm has not ended, as discussed above, it is determined whether or not an error caused by generating a feedback loop including no delay has occurred (step S224).

If it is determined in step S224 that a feedback loop including no delay is not generated, the flow returns to step S221, and continues the initial path routing algorithm. If it is determined in step S224 that a feedback loop including no delay is generated, it is determined whether or not it is preset that an additional delay element is automatically inserted (step S225).

If it is determined in step S225 that it is not preset that an additional delay element is automatically inserted, the addition (dynamic change) of a plugin is cancelled, and an error message is sent to the user (step S226). Then, the path routing processing routine ends.

If it is determined in step S225 that it is preset that an additional delay element is automatically inserted, the preset setting information stored in the preset function unit 10 is referred to, and it is determined whether or not the additional delay element to be automatically inserted is to be inserted in front of an added plugin (NLTP) including no delay (step S227).

If it is determined in step S227 that the insertion position is the front-side position, the delay element having the preset amount of delay is inserted in front of the plugin added by the user to generate a feedback loop (step S228). If it is determined in step S227 that the insertion position is not the front-side position but the rear-side position, the delay element having the preset amount of delay is inserted behind the plugin added by the user to generate a feedback loop (step S229).

After the processing of step S228 or S229, the flow returns to step S221, and the initial path routing algorithm is re-executed. Since the additional delay element is automatically inserted in the feedback loop, the initial path routing algorithm normally ends.

The insertion of an additional delay element will now be specifically described. For example, as shown in FIG. 25 or 26, in a circuit composed of four plugins 901 to 904 connected in cascade, a user performs the dynamic changing process to connect an additional plugin 905 between the plugins 903 and 902 to create a feedback loop.

Figure 25:
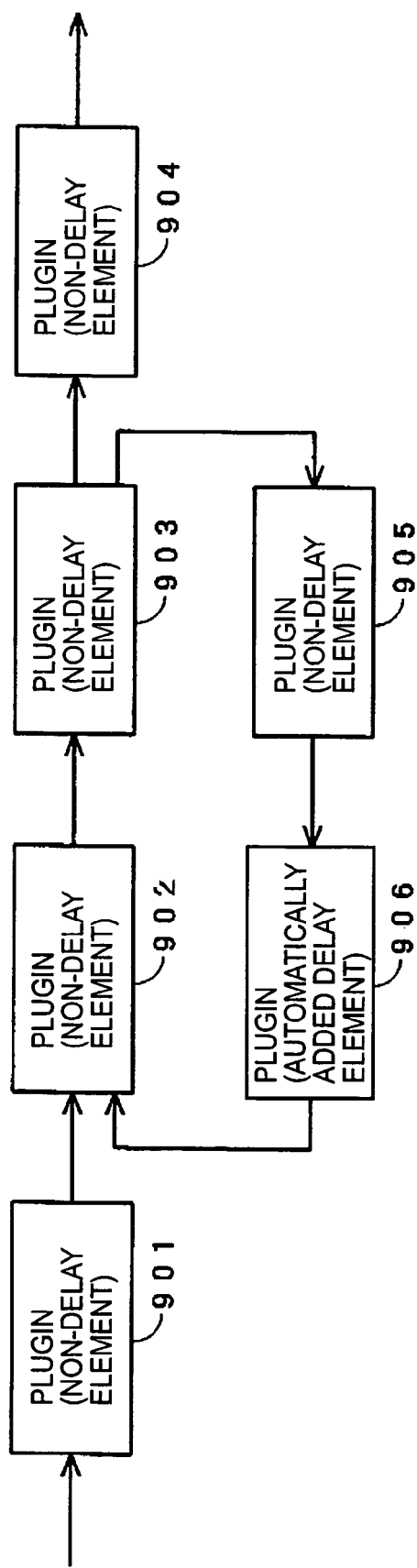
FIG. 25 is a diagram showing a main operation of the signal processing apparatus according to the second embodiment shown in FIG. 22.

In this case, when the additional plugin 905 inserted in the feedback loop is an NLTP plugin, which is non-delay element, as discussed above, if it is preset that an additional delay element is automatically inserted and the insertion position of the delay element is the front-side position, as shown in FIG. 25, a plugin 906, which is a delay element, is inserted on the output side of the plugin 905. The amount of delay of the plugin 906, which is a delay element, is preset, as discussed above.

Figure 26:
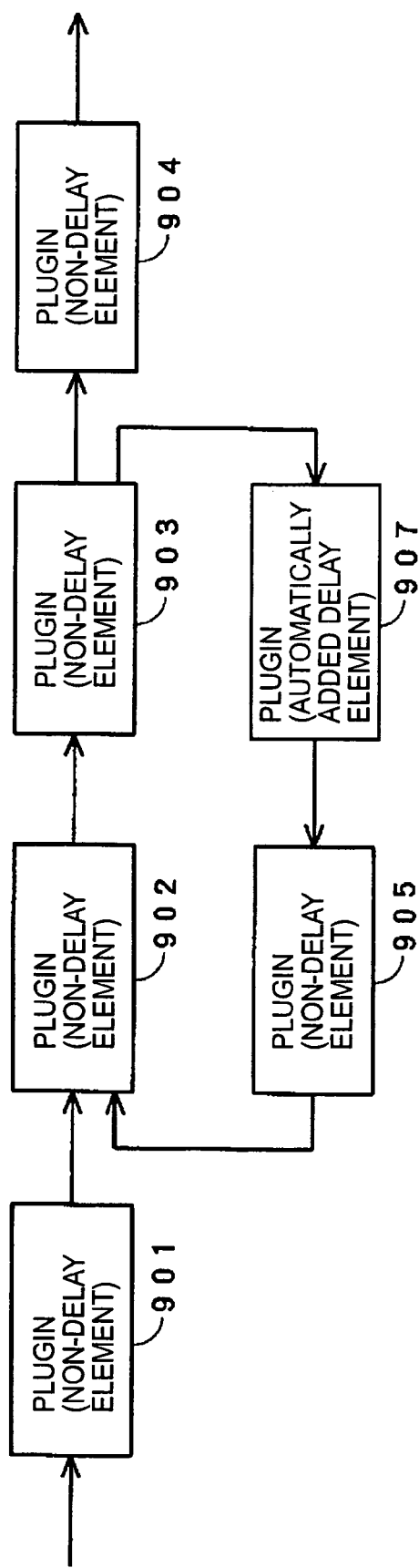
FIG. 26 is a diagram showing the main operation of the signal processing apparatus according to the second embodiment shown in FIG. 22.

If it is preset that the insertion position of the delay element is the rear-side position, as shown in FIG. 26, a plugin 907, which is a delay element, is inserted on the input side of the plugin 905.

Figure 27:
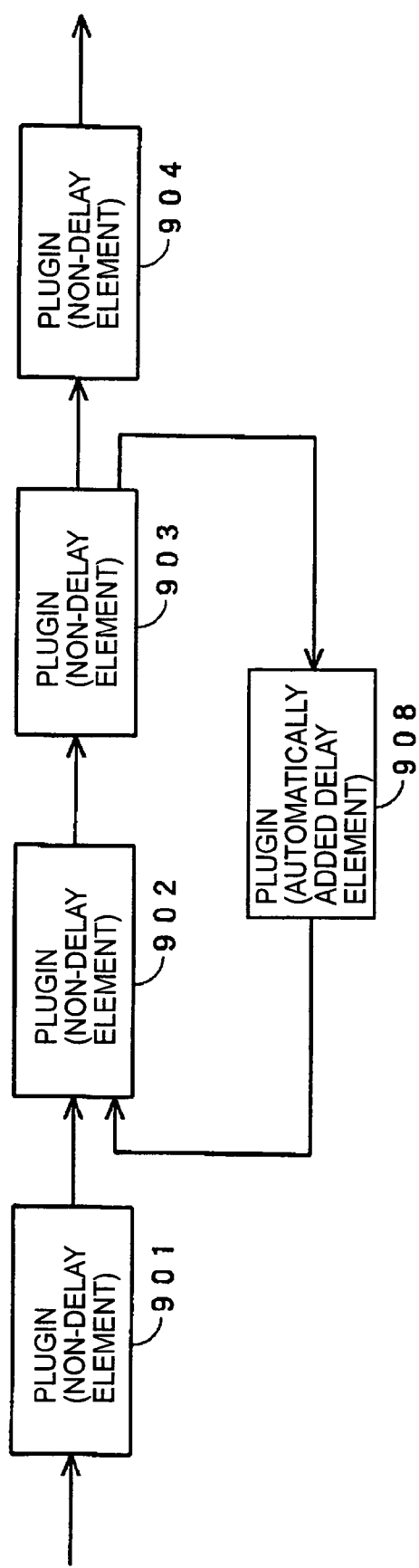
FIG. 27 is a diagram showing the main operation of the signal processing apparatus according to the second embodiment shown in FIG. 22.

When a feedback loop is set up without connecting an additional plugin, for example, as shown in FIG. 27, a plugin 908, which is a delay element, is also automatically inserted in the manner illustrated in FIG. 27.

According to the second embodiment, when a user aims to rapidly change the circuit design during audio signal processing, if the user accidentally create a feedback loop including no delay, a delay element is automatically inserted, thus achieving the initial aim of the user.

For example, the signal processing tool according to the second embodiment is used for live performance applications, a user sometimes desires to rapidly change the circuit design in synchronization with music while producing sound. In such a case, if the user accidentally creates a feedback circuit including no delay element, it is often difficult to change the circuit design at a desired timing, leading to a problem with live performance. This problem is overcome by the second embodiment.

Particularly, feedback loop circuits are frequently used for sound effectors, sound filters, and so forth. In live performances, users are eager to create a closed loop circuit by performing a single additional operation. For example, a user desires to change the circuit design on the first attempt in synchronization with music-bar break. In such a case, the user can rapidly change the circuit design in tune with the music according to the second embodiment.

While the second embodiment is applied to dynamic circuit change, like the first embodiment, the second embodiment may also be applied to a case where a circuit is initially created.

The first and second embodiments discussed above further achieve the following advantages.

According to the above-described embodiments, in software digital signal processing, it is possible to create a circuit without increased processing delay if signal processing circuits are connected in multiple stages. It is further possible to create any desired digital signal processing circuit including a feedback structure. It is still further possible to dynamically change the circuit structure of the digital signal processing circuit. Dynamically updatable circuit elements are:

the addition or deletion of a plugin;
    the connection between plugins;
    the addition or deletion of an input or output port of a plugin; and parameters relating to signal processing, such as the packet size and sampling frequencies in signal processing.

By implementing the middleware of the signal processing apparatus according to the foregoing embodiments in products, the products whose circuit structure is dynamically changeable can be manufactured.

Further, the thus created signal processing circuit is stored in a file, thus allowing the signal processing circuit to be recovered later. This file is exchanged to facilitate replacement or reuse of the circuit.

If the signal processing circuit has a circuit structure including a feedback loop, the number of calls of signal-processing functions can be minimized, resulting in low CPU load needed to perform real-time signal processing.

A network allows real-time distribution processing. A plurality of circuits on the network can synchronously be operated in real time.

While the foregoing embodiments have been described in the context of a case where a feedback loop including no delay is created when a plugin or a connection is added, an embodiment of the present invention may also be applied to a case where an existing circuit is somewhat added, deleted, or modified and a feedback loop circuit including no delay element is finally created.

While the foregoing embodiments have been discussed in the context of audio signal processing, signals other than audio signals may also be processed.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus comprising:
   at least one processor programmed to:
     perform a plurality of unit signal-processing steps using a plurality of signal processing software modules, wherein each of the plurality of signal processing software modules comprises at least one input and at least one output;
     receive a first instruction to generate or delete a signal processing software module and a second instruction to connect the at least one input and the at least one output of at least two of the plurality of signal processing software modules;
     establish a virtual connection between the at least one input and the at least one output of the at least two of the plurality of signal processing software modules in response to the second instruction;
     store and manage information relating to the virtual connection between the at least one input and the at least one output of the at least two of the plurality of signal processing software modules;
     route a signal processing path to determine a signal processing order for the plurality of the signal processing software modules, wherein the signal processing path includes at least one feedback loop; and
     execute the plurality of signal processing software modules in the signal processing order based on the signal processing path,
   wherein routing a signal processing path comprises determining whether the at least one feedback loop includes a delay element.

2. The signal processing apparatus according to claim 1, wherein the at least one processor is further programmed to: send a warning to a user when it is determined that the at least one feedback loop does not include a delay element.

3. The signal processing apparatus according to claim 1, wherein the at least one processor is further programmed to:
   insert an additional delay element in the at least one feedback loop when it is determined that the at least one feedback loop does not include a delay element.

4. The signal processing apparatus according to claim 3, wherein the at least one processor is further programmed to:
   input, when it is determined that the at least one feedback loop does not include a delay element, a preset setting as to whether an additional delay element is automatically inserted in the at least one feedback loop,
   wherein routing the signal processing path comprises, when it is determined that the at least one feedback loop does not include a delay element referring to the preset setting and inserting an additional delay element in the at least one feedback loop when the preset setting specifies that an additional delay element is automatically inserted in the at least one feedback loop.

5. The signal processing apparatus according to claim 3, wherein the at least one processor is further programmed to:
   hold a preset value indicating an amount of delay of the additional delay element to be inserted,
   wherein, when it is determined that the at least one feedback loop does not include a delay element, the additional delay element having the preset amount of delay is inserted in the at least one feedback loop.

6. The signal processing apparatus according to claim 3, wherein the at least one processor is further programmed to:
   hold a preset position indicating an insertion position of the additional delay element to be inserted,
   wherein, when it is determined that the at least one feedback loop does not include a delay element, the additional delay element is inserted in the at least one feedback loop at the preset position.

7. A signal processing method for performing signal processing including a plurality of unit signal-processing steps by means of software processing, the method comprising the steps of:
   receiving a first instruction to generate or delete a signal processing software module and a second instruction to connect at least one input and at least one output of at least two of a plurality of signal processing software modules;
   setting up a virtual connection between the at least one input and the at least one output of the at least two of the plurality of signal processing software modules in response to the second instruction;
   routing a signal processing path to determine a signal processing order in which the plurality of virtually connected signal processing software modules perform the signal processing, wherein the signal processing path includes at least one feedback loop; and
   performing the signal processing by sequentially executing the signal processing software modules in the signal processing order determined in the step of routing a signal processing path,
   wherein it is determined in the step of routing a signal processing path whether the at least one feedback loop includes a delay element.

8. The signal processing method according to claim 7, further comprising a step of:
   sending a warning to a user when it is determined that the at least one feedback loop does not include a delay element.

9. The signal processing method according to claim 7, wherein, when it is determined that the at least one feedback loop does not include a delay element, an additional delay element is inserted in the at least one feedback loop.

10. The signal processing method according to claim 9, further comprising a step of:
inputting, when it is determined that the at least one feedback loop does not include a delay element, a preset setting as to whether an additional delay element is automatically inserted in the at least one feedback loop,
wherein, when it is determined that the at least one feedback loop does not include a delay element, referring to the preset setting and inserting an additional delay element in the at least one feedback loop when the preset setting specifies that an additional delay element is automatically inserted in the at least one feedback loop.

11. A non-transitory computer-readable recording medium storing a program for causing a computer to execute signal processing including a plurality of unit signal-processing steps, the program comprising instructions for executing the steps of:
receiving a first instruction to generate or delete a signal processing software module and a second instruction to connect at least one input and at least one output of at least two of a plurality of signal processing software modules;
establishing a virtual connection between the at least one input and the at least one output of the at least two of the plurality of signal processing software modules in response to the second instruction;
routing a signal processing path to determine a signal processing order for the plurality of virtually connected signal processing software modules, wherein the signal processing path includes at least one feedback loop; and
executing the signal processing software modules in the signal processing order based on the signal processing path,
wherein it is determined in the step of routing a signal processing path whether the at least one feedback loop includes a delay element.

12. The recording medium according to claim 11, wherein the program further comprises a step of:
sending a warning to a user when it is determined that the at least one feedback loop does not include a delay element.

13. The recording medium according to claim 11, wherein, when it is determined that the at least one feedback loop does not include a delay element, an additional delay element is inserted in the at least one feedback loop.

14. The recording medium according to claim 13, further comprising a step of inputting, when it is determined that the at least one feedback loop does not include a delay element, a preset setting as to whether an additional delay element is automatically inserted in the at least one feedback loop,
wherein when it is determined that the feedback loop does not include a delay element, the preset setting input is referred to, and an additional delay element is inserted in the at least one feedback loop when the preset setting specifies that an additional delay element is automatically inserted in the at least one feedback loop.

* * * * *